United States Patent
Smith et al.

(10) Patent No.: US 11,042,682 B2
(45) Date of Patent: *Jun. 22, 2021

(54) ANALOG DESIGN TOOL HAVING A CELL SET, AND RELATED METHODS

(71) Applicant: Silicon Technologies, Inc., Midvale, UT (US)

(72) Inventors: Kent F. Smith, Holladay, UT (US); Thomas L. Wolf, Salt Lake City, UT (US); Tracy L. Johancsik, Murray, UT (US); Thomas G. Wolf, Bloomington, IN (US); Kyler C. Fillerup, Orem, UT (US)

(73) Assignee: Silicon Technologies, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,272

(22) Filed: Jun. 12, 2020

(65) Prior Publication Data
US 2020/0302105 A1  Sep. 24, 2020

Related U.S. Application Data

(63) Continuation of application No. 15/473,515, filed on Mar. 29, 2017, now Pat. No. 10,789,407.
(Continued)

(51) Int. Cl.
*G06F 30/394* (2020.01)
*G06F 30/392* (2020.01)
(Continued)

(52) U.S. Cl.
CPC ........ *G06F 30/394* (2020.01); *G06F 30/3323* (2020.01); *G06F 30/392* (2020.01);
(Continued)

(58) Field of Classification Search
CPC .. G06F 30/392; G06F 30/3323; G06F 30/398; G06F 2119/18; G06F 2111/04; G06F 30/394; G06F 30/39; G06F 30/36
See application file for complete search history.

(56) References Cited

U.S. PATENT DOCUMENTS 5,801,407 A  9/1998  Yamada
5,847,421 A  12/1998  Yamaguchi
(Continued)

*Primary Examiner* — Nha T Nguyen
(74) *Attorney, Agent, or Firm* — TraskBritt

(57) ABSTRACT

Methods for generating a cell set for an analog design tool are disclosed. A method comprises receiving, at a cell generator, one or more electronic files of a process-specific architectural cell (AP_Cell) having wiring for power and ground, FILL, wherein the AP_Cell is configured according to a first manufacturing process. The method further includes receiving, at the cell generator, one or more electronic files of a schematic cell (S_Cell) having internal wiring between circuit elements to provide a function for the S_Cell. The method also includes merging data from the one or more electronic files of the AP_Cell and the one or more electronic files of the S_Cell to generate a process-specific schematic cell (SP_Cell) used as a building block for a physical layout of an analog IC, wherein the process-specific schematic cell comprises one or more electronic files. Related devices are also described herein.

8 Claims, 22 Drawing Sheets

Related U.S. Application Data

(60) Provisional application No. 62/315,487, filed on Mar. 30, 2016, provisional application No. 62/315,499, filed on Mar. 30, 2016.

(51) Int. Cl.
  *G06F 30/398* (2020.01)
  *G06F 30/3323* (2020.01)
  *G06F 111/04* (2020.01)
  *G06F 119/18* (2020.01)

(52) U.S. Cl.
  CPC ........ *G06F 30/398* (2020.01); *G06F 2111/04* (2020.01); *G06F 2119/18* (2020.01)

(56) References Cited

U.S. PATENT DOCUMENTS

| | | | |
|---|---|---|---|
| 6,550,046 B1 | 4/2003 | Balasa et al. | |
| 6,590,448 B1 | 7/2003 | Burt | |
| 6,802,050 B2 | 10/2004 | Shen et al. | |
| 7,543,262 B2 | 6/2009 | Wang et al. | |
| 7,594,216 B2 | 9/2009 | Kotani et al. | |
| 7,665,054 B1 | 2/2010 | Gopalakrishnan et al. | |
| 7,739,646 B2 | 6/2010 | Lin et al. | |
| 8,286,107 B2 | 10/2012 | Smayling et al. | |
| 8,352,893 B1 | 1/2013 | Lin et al. | |
| 8,434,037 B2 | 4/2013 | Krishnan | |
| 8,694,941 B1 | 4/2014 | Badel et al. | |
| 8,716,869 B2 | 5/2014 | Nakagawa et al. | |
| 8,719,754 B1 | 5/2014 | Ginetti | |
| 8,726,218 B2 | 5/2014 | Maziasz et al. | |
| 8,788,990 B2 | 7/2014 | Meserve | |
| 8,893,069 B2 | 11/2014 | Su et al. | |
| 9,256,706 B2 | 2/2016 | Chen et al. | |
| 9,383,638 B2 | 7/2016 | Ishii | |
| 9,438,237 B1 | 9/2016 | Haigh et al. | |
| 9,817,932 B2 | 11/2017 | Sherman | |
| 9,928,331 B2 | 3/2018 | Rozenfeld et al. | |
| 2005/0028121 A1 | 2/2005 | Shrowty et al. | |
| 2005/0193363 A1 | 9/2005 | Gupta et al. | |
| 2006/0136848 A1 | 6/2006 | Ichiryu et al. | |
| 2007/0006103 A1 | 1/2007 | Zhang et al. | |
| 2007/0113216 A1 | 5/2007 | Zhang | |
| 2007/0245284 A1 | 10/2007 | Sinha et al. | |
| 2008/0222587 A1 | 9/2008 | Smayling et al. | |
| 2008/0224176 A1 | 9/2008 | Nakanishi et al. | |
| 2009/0055793 A1 | 2/2009 | Melzner | |
| 2009/0100396 A1 | 4/2009 | Smayling et al. | |
| 2009/0235219 A1 | 9/2009 | Lin et al. | |
| 2009/0293038 A1 | 11/2009 | Maeda et al. | |
| 2010/0001404 A1 | 1/2010 | Ikegami et al. | |
| 2010/0107133 A1 | 4/2010 | Nakagawa et al. | |
| 2010/0169847 A1 | 7/2010 | Gupta et al. | |
| 2010/0258798 A1* | 10/2010 | Sokel | H01L 22/34 257/48 |
| 2011/0049575 A1 | 3/2011 | Tanaka | |
| 2011/0145775 A1 | 6/2011 | Sano | |
| 2011/0167396 A1 | 7/2011 | Riviere-Cazaux | |
| 2011/0278679 A1 | 11/2011 | Tabata et al. | |
| 2012/0233576 A1 | 9/2012 | Barrows et al. | |
| 2013/0042216 A1 | 2/2013 | Loh et al. | |
| 2013/0091481 A1 | 4/2013 | Su et al. | |
| 2013/0183832 A1 | 7/2013 | Landis | |
| 2013/0329202 A1 | 12/2013 | Mikami et al. | |
| 2014/0157212 A1 | 6/2014 | Chang et al. | |
| 2015/0017572 A1 | 1/2015 | Ishii | |
| 2015/0067626 A1 | 3/2015 | Chen et al. | |
| 2015/0177609 A1 | 6/2015 | Mikami et al. | |
| 2018/0006010 A1 | 1/2018 | Lo et al. | |
| 2019/0042684 A1 | 2/2019 | Toub et al. | |

\* cited by examiner

ANALOG DESIGN TOOL HAVING A CELL SET, AND RELATED METHODS

CROSS-REFERENCE TO RELATED APPLICATIONS

This application is a continuation of U.S. patent application Ser. No. 15/473,515, filed Mar. 29, 2017, now U.S. Pat. No. 10,789,407, issued Sep. 29, 2020, which claims the benefit of U.S. Provisional Patent Application Ser. No. 62/315,543, filed Mar. 30, 2016, U.S. Provisional Patent Application Ser. No. 62/315,487, filed Mar. 30, 2016, and U.S. Provisional Patent Application Ser. No. 62/315,499, filed Mar. 30, 2016, the disclosure of each of which is hereby incorporated herein in its entirety by this reference.

This application is also related to U.S. patent application Ser. No. 15/473,525, filed Mar. 29, 2017, now U.S. Pat. No. 10,380,307, issued Aug. 13, 2019, which also claims the benefit of U.S. Provisional Patent Application Ser. Nos. 62/315,543, 62/315,487, and 62/315,499.

TECHNICAL FIELD

This disclosure relates generally to the field of semiconductor devices. In particular, the disclosure relate to the design of analog integrated circuits using cell sets.

BACKGROUND

Integrated circuit cell sets are used as building blocks in the design for a wide variety of integrated circuit devices. As an example, U.S. Pat. No. 5,801,407 describes a conventional analog cell that is configured as an operational amplifier that is used to design an integrated circuit. A conventional operational amplifier laid out in a cell arrangement is disclosed in U.S. Pat. No. 6,590,448. This conventional operational amplifier consists of the layout of operational amplifier cells that can be combined to create a larger operational amplifier but due to internal node saturation problem, it has been difficult and impractical to construct larger operational amplifiers. The '448 patent describes how to combine operational amplifier cells in single, two, and three stage designs and to change $G_m$.

Conventional analog design methods include designing circuits using a high-level description language, followed by schematic entry and simulating with a variety of simulators with ideal models. The physical layers are then laid out using a layout editor, verified correct using a design rule (DRC) checker, and a layout versus schematic (LVS) checker verifies the layout matches the schematic, verified for electrical rules, power density, temperature density, and then extracted and simulated again.

For example, a conventional design flow may be as follows:
1. Top Level Modeling and Specification
2. Schematic Entry
3. Schematic Level Simulation (pre-extracted circuit)
4. Physical Layout
5. Design Rule verification of Physical Layout (DRC)
6. Physical Layout verification of Schematic (LVS)
7. Verify Electronic Rules (ERC)
8. Extracted circuit from Physical Layout
9. Simulation of extracted circuit
10. Insert Design For Manufacturing Elements
11. Extracted circuit from Physical Layout with Design for Manufacturing elements
12. Simulation of extracted circuit with Design for Manufacturing elements
13. Send Verified circuit to manufacturing plant Any errors in the design at any step require repeating the step or going back to previous steps. Due to the complexity of today's designs and manufacturing, many people work together designing a semiconductor circuit and often a different person is assigned to each step.

In addition, during the conventional design process, circuit elements may be used in a variety of complex arrangements. For example, an operational amplifier may be arranged in various parallel arrangements that allows the designer to change the input $G_m$, internal topology, and output $G_m$ to build circuits that can output large current loads for power applications. Another use of high performance operational amplifiers is in the use of accurate low gain, high bandwidth devices. An issue with the design of analog circuits is that the changing of one transistor or wire in the design affects more than one parameter, which makes the design complicated due to the multivariable changes. For example, when the bandwidth of an operational amplifier must be changed, the designer often finds the $G_m$ is also changed.

Due to the high cost of non-recurring engineering (NRE) for state-of-the-art microelectronics, costs of the design are now exceeding $100 M. Much of this cost is due to the mask costs, which itself can exceed $10 M. This assumes the chip works the first time which is an increasingly rare occurrence. Each time the chip fails, another mask set may be needed with a cost of another $10 M. Large volume chip producers may be able to recoup this amount; however, small volume producers may be cost prohibitive.

BRIEF SUMMARY

An analog IC design tool having cell sets for generating a physical layout from a schematic layout is disclosed. The tool comprises a process-specific architectural cell (AP_Cell) having a fixed number of circuit elements without internal wiring providing functionality, and configured according to a specific manufacturing process with manufacturing FILL, a plurality of schematic cells (S_Cells) having the fixed number of circuit elements, each schematic cell (S_Cell) having a different internal wiring for different functionalities, and a cell generator configured to generate a set of process-specific cells having the different internal wiring of the S_Cells and configured to be design rule compliant according to the specific manufacturing process and manufacturing FILL of the AP_Cell.

A method for generating a cell set for an analog design tool comprises receiving a process-specific architectural cell (AP_Cell) having wiring for power and ground, FILL, the AP_Cell configured according to a first manufacturing process, receiving a schematic cell (S_Cell) having internal wiring between circuit elements to provide a function for the S_Cell, and merging data from the AP_Cell and the S_Cell to generate a process-specific schematic cell (SP_Cell) used as a building block for a physical layout of an analog IC.

DETAILED DESCRIPTION

Figure 1:
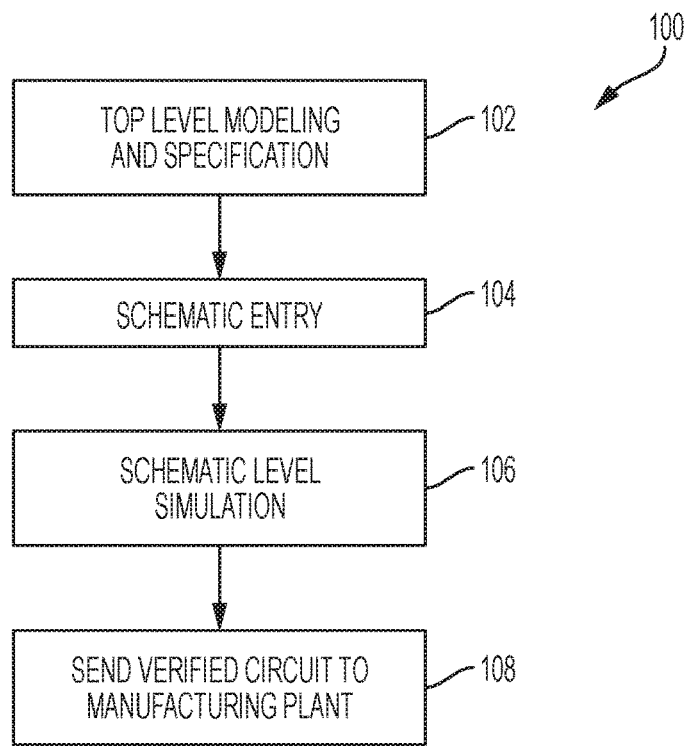
FIG. 1 is a flowchart illustrating a method for designing and manufacturing an analog IC according to an embodiment of the disclosure.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist audibly-impaired users. Embodiments include features that improve the functionality of the communication device such that a new communication device and method for controlling a video communication device is provided. As a result, the interaction of the communication device with other systems may be improved in addition to an improved user experience.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium, and which may be executed by the processor. Computer-readable media includes both computer storage media and communication media including any medium that facilitates transfer of a computer program from one place to another. Thus, computer-readable media may be non-transitory storage media.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, process-specific cells are analog building blocks (e.g., circuit elements) that already have the metal, poly, and diffusion physically laid out with predefined wiring and FILL, thus defining and controlling all of the stray capacitance, inductances, resistances, and non-related signal cross over for the designer. In addition, the interconnecting wires between related and non-related cell elements may be well defined. Embodiments of the disclosure, therefore, may enable analog circuit designers to examine during simulation the analog effects of the actual signal wave as it passes from one circuit element to another.

As used herein, "FILL" (also referred to as design-for-manufacturing (DFM) elements) refers to a filler (e.g., conductive, insulative, etc.) that may be disposed during manufacturing of the various layers of an integrated circuit (IC) that cause each layer to be planarized to improve manufacturing the IC as processes become smaller. The Fill may be disposed into the IC according to one of the many processes employed by those skilled in the art. Adding FILL during fabrication of the IC results in additional parasitics (e.g, capacitance, resistance, inductance) that may not have been adequately accounted for by the analog circuit designer or the layout designer. As a result, problems associated with the FILL may not be discovered until after the IC has been fabricated. Embodiments of the disclosure may include generating cell sets during the design phase that already have FILL added to it, and that have been verified for correctness for the particular manufacturing process. As a result, the analog circuit designer may be able to avoid and/or detect problems associated with the FILL early during the design process as opposed to after the IC is fabricated. Thus, the design process may be improved by reducing the time and wasted expense associated with redesigns, and the fabricated ICs that are put into actual use may also be improved as the physical layout may more accurately match the initial schematic design and simulation.

Embodiments of the disclosure may provide an improved method to design analog circuits with cell sets that contain the manufacturing structures required for planarization and optical proximity correction of the mask structures for a variety of different analog circuit elements. The cell sets may be electronic files stored in memory for future use when building a physical layout of a designed IC. A semiconductor schematic may be built through a computer design tool using circuit symbols in a schematic editor which have a physical representation representing the physical layers. The cells used to build a semiconductor circuit may be design rule correct, layout versus schematic correct, electronic rule correct (ERC), and/or power density correct. All design steps can be undertaken by a single analog circuit designer (e.g., design engineer), providing that analog circuit designer complete control of the design process. Embodiments may also include physical cells that contain all manufacturing data and have been extracted, which allows the analog circuit designer to simulate the extracted layout earlier in the design flow.

FIG. 1 is a flowchart 100 illustrating a method for designing and manufacturing an analog IC according to an embodiment of the disclosure. At act 102, the top level modeling and specification may be defined. At act 104, the analog circuit designer may perform schematic entry. At act 106, the schematic level simulation (pre-extracted or extracted circuit) may be performed that builds a physical layout using the pre-stored cells that are design rule correct, layout versus schematic correct, etc. Again, this can be performed by the analog circuit designer during the design stage as opposed to being sent to a different layout designer to complete the physical layout. At act 108, the physical layout of the verified circuit may be sent to a manufacturing plant to create the mask and fabricate the IC. Thus, embodiments of the disclosure may improve upon the conventional design process discussed above in that several steps of the design process may be reduced and/or eliminated, and may also be performed by the analog circuit designer.

Figure 2:
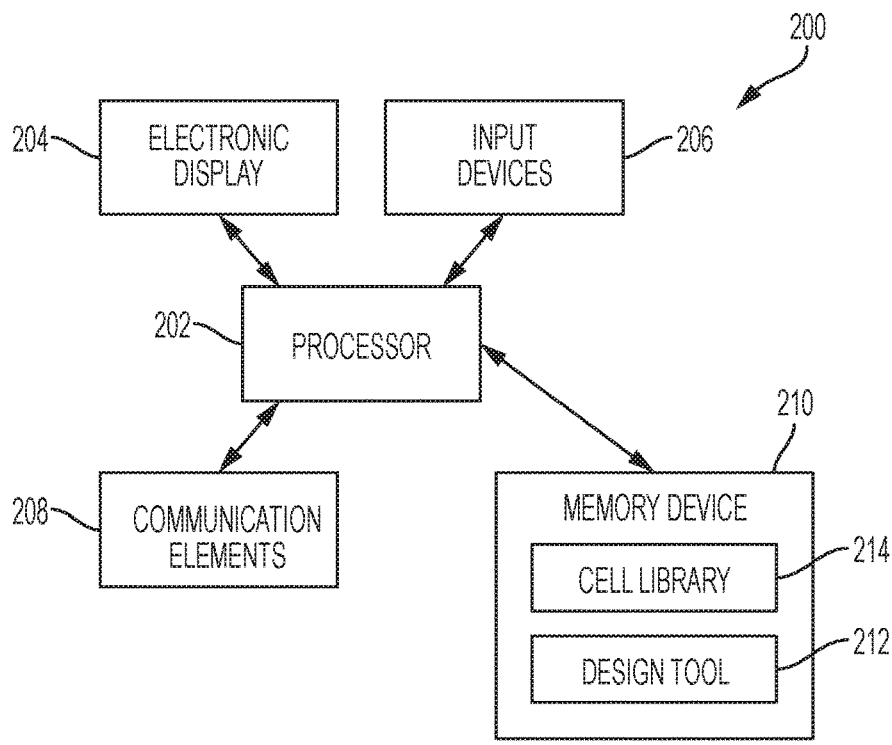
FIG. 2 is a simplified schematic block diagram of a computer system according to an embodiment of the disclosure.

FIG. 2 is a simplified schematic block diagram of a computer system 200 according to an embodiment of the disclosure. The computer system 200 includes a processor 202 operably coupled with an electronic display 204, input devices 206, communication elements 208, and a memory device 210. The processor 202 may include one or more processors configured to coordinate the communication between the various devices as well as execute instructions for a design tool stored in computer-readable media of the memory device 210. The memory device 210 may include volatile and non-volatile memory storage for the computer system 200.

Input devices 206 may include devices such as a keyboard, touch screen interface, remote control, or other devices that are configured to receive information from the analog circuit designer that may be used by the processor 202 to operate different functions of computer system 200, such as enabling the analog circuit designer to design a schematic layout of an integrated circuit, create a physical layout from the design layout, simulate and/or perform tests of the physical layout, etc. as will be described in more detail below. The electronic display 204 is configured to present a design tool interface for the analog circuit designer to design an analog circuit.

The memory device 210 may have a design tool 212 stored therein that is executed by the processor 202 according to the instructions and inputs received. The memory device 210 may also have a cell library 214 stored thereon with cell sets that are physical representations of certain circuit functions, and which are retrieved by the processor 202 during execution of the design tool 212 to generate the physical layout of an IC as discussed below. The pre-stored cells may be retrieved from the cell library 214 to create the physical layout for a working circuit designed by the analog circuit designer.

The design tool 212 provides the design tool interface and that is further configured to automate the design of analog circuits using a wide selection of schematic editors, simulators, and physical layout tools. The design tool 212 employs a structured design technique that simplifies the design, layout, and verification of a circuit over conventional circuit design methods. For example, embodiments of the disclosure may automate aspects of the layout of circuitry resulting in a design time and cost savings of more than 2×. In some embodiments, the functional design, schematic design, and physical design may be combined into one step, which may reduce the number of design steps, increasing design productivity, and reducing the probability of manufacturing required components (e.g., FILL or design for manufacturing DFM) unknowingly affecting the design.

The completed design corresponds to the schematic representation, the structural representation, and the physical representation of the circuit. This method of representing the circuit automates many steps in the design process. The design is created with physical cells that are pre-defined and pre-stored in the cell library 214 and that may contain all physical elements of the laid-out cells. The entire physical layout can be extracted to give a complete SPICE netlist. Thus, allowing the analog circuit designer to simulate the physical design at schematic entry and eliminating the tedious steps of layout, DRC, and LVS. The analog circuit designer controls layout topology at the same time they control schematic capture, allowing the analog circuit designer to control the circuit delays and interaction between circuit elements directly.

Simulations at the time of capture will be made on the automatically generated physical layout as opposed to layout that is made by a layout engineer after the schematic is drawn. Thus, the analog circuit designer may have essentially immediate access to a completed module at the time of schematic capture. The analog circuit designer will have very accurate simulation models of each module since the circuit elements will be pre-designed and thoroughly characterized and will include the effect of proximity to other circuit elements as well as components added by FILL. The analog circuit designer will be making the interconnects between modules and the physical layout at the time of schematic capture. The analog circuit designer will not have to guess about the parasitic effect of interconnects.

Figure 3A:
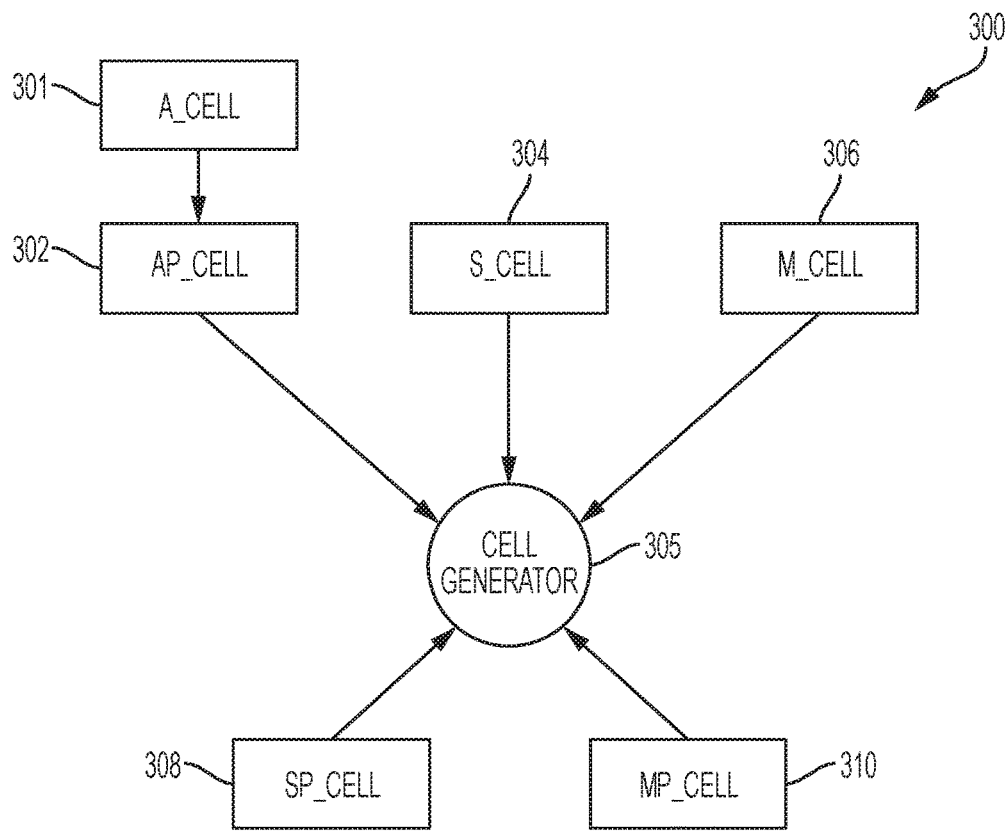
FIG. 3A is a simplified block diagram illustrating elements involved in generating process-specific cell sets for the cell library according to an embodiment of the disclosure.

FIG. 3A is a simplified block diagram 300 illustrating elements that may be involved in generating process-specific cell sets for the cell library 214 (FIG. 2). Certain cell sets may be utilized in this process, including Architectural Cells 301 (hereinafter "A_Cells"), Process-Specific Architectural Cells 302 (hereinafter "AP_Cells"), Schematic Cells 304 (hereinafter "S_Cells"), Multiple Schematic Cells 306 (hereinafter "M_Cells"), Process-Specific Cells 308 (hereinafter "SP_Cells"), and Process-specific M_Cells 310 (hereinafter "MP_Cells").

Figure 4:
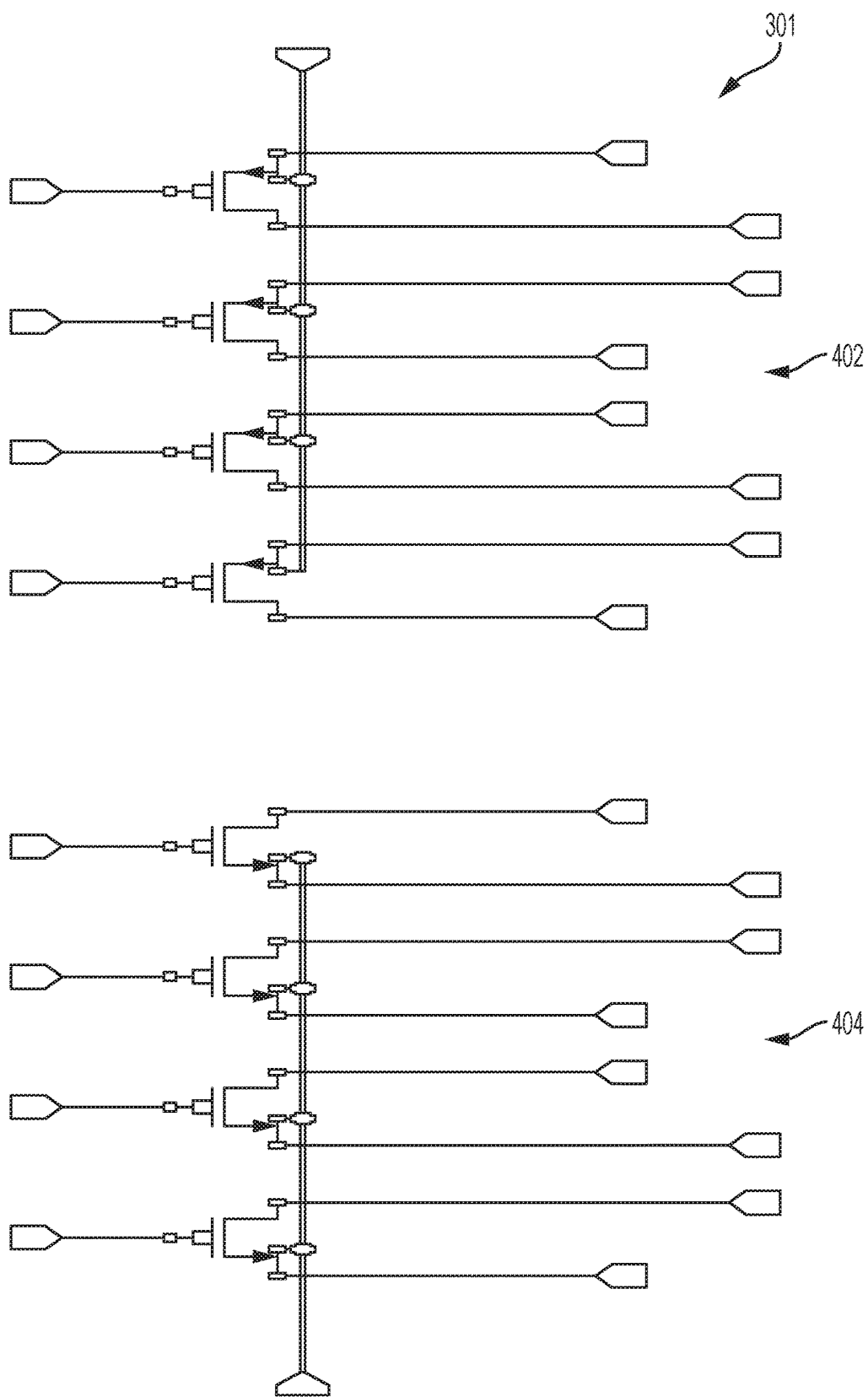
FIG. 4 is a schematic diagram of an A_Cell according to an embodiment of the disclosure.

A_Cells 301 (an example of which is also shown in FIG. 4) include the architectural data for a generic process and are independent of any specific semiconductor manufacturing process or design rules. A_Cells 301 may include ideal transistors, resistors, inductors, capacitors, diodes, and/or other semiconductor elements, including combinations thereof. A_Cells 301 may not include internal wiring between specific circuit elements, but may include a grid of power, ground, and signal wiring that allows combing with other cells and automatically connecting power and ground. The size and components of an A_Cell 301 may be standard so that there is uniformity across the entire system when multiple cells are connected to generate the physical layout. For example, an A_Cell 301 may be defined to have a cell size having N transistors (e.g., N is some positive integer greater than two). Thus, in some embodiments, N may be defined as 8 transistors within each A_Cell 301 of the system whereas in other embodiments N may be defined as 28 transistors within each A_Cell 301 of the system.

AP_Cells 302 (an example of which is shown in FIGS. 5A-5E) are similar to A_Cells 301 except they contain the architectural data for each process and are semiconductor manufacturing process-specific. AP_Cells 302 may include transistors, resistors, inductors, capacitors and/or other semiconductor elements in any combination that are semiconductor manufacturing process specific with regard to certain cell set requirements (e.g., transistor size). AP_Cells 302 may not include internal wiring between specific elements, but may include a grid of power, ground, and signal wiring on a grid that allows combing cells and automatically connecting power and ground. AP_Cells 302 may also include design-for-manufacturing elements (also referred to as "Fill"). As a result, AP_Cells 302 may be design rule correct (DRC) and support abutting additional cells in a variety of combinations for use as a base to build cells with additional functionality.

Figure 7:
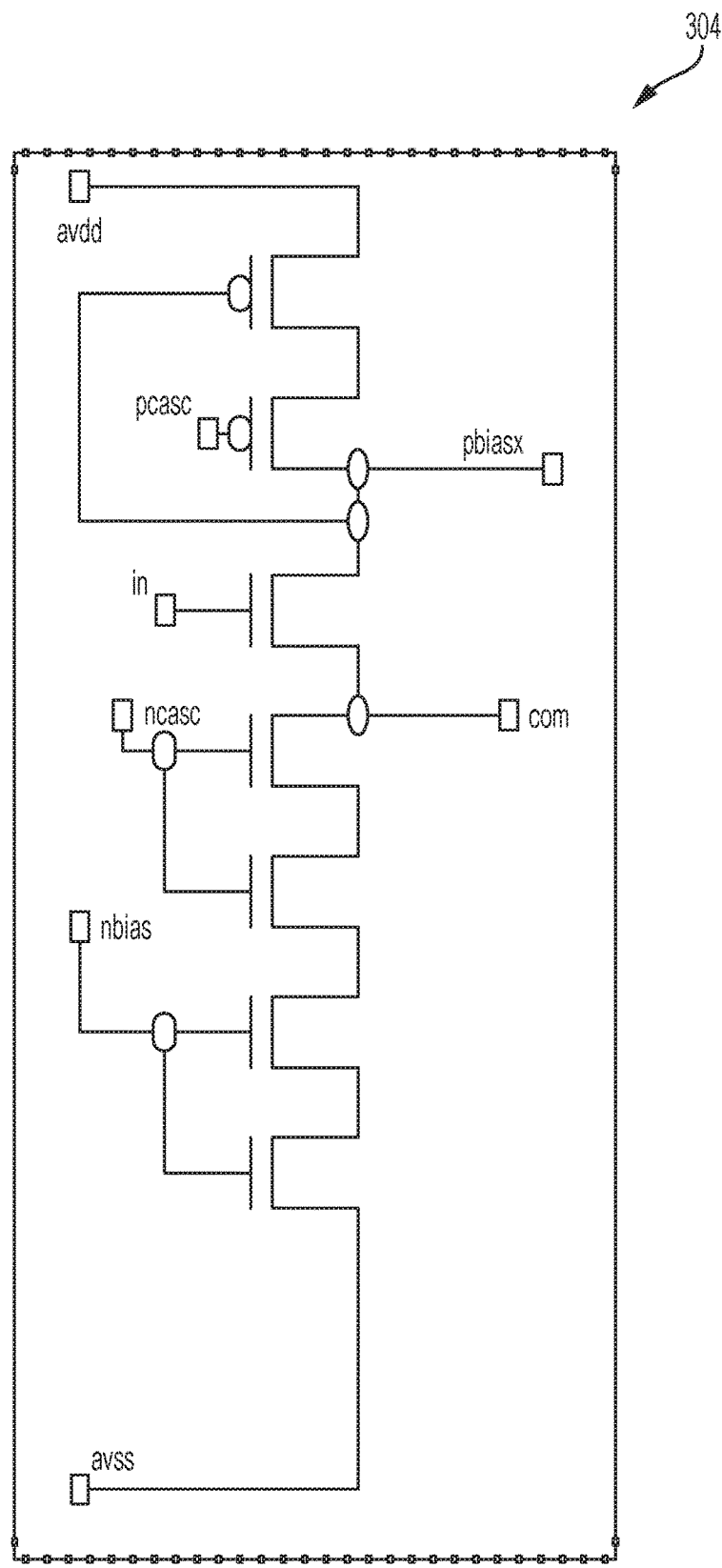
FIG. 7 is an example of an S_Cell according to embodiments of the disclosure.

S_Cells 304 (an example of which is shown in FIG. 7) include a schematic and functional description to be applied to the elements of an AP_Cell 302; however, the S_Cells 304 are semiconductor manufacturing process agnostic. S_Cells 304 tend to perform more simple functions that may be achieved within a single cell. In some embodiments, S_Cells 304 may be represented in schematic form only.

M_Cells 306 (example shown in FIGS. 9A and 9B) also include schematic and functional description to be applied to the elements of an AP_Cell 302 (or more accurately a group of AP_Cells 302). M_Cells 306 tend to perform more complex functions that may be achieved within multiple cells. Like S_Cells 304, M_Cells 306 may be semiconductor manufacturing process agnostic. In some embodiments, M_Cells 306 may be created by combining S_Cells 304 in a variety of different combinations to create the additional circuit functions to be performed by the M_Cells 306. The S_Cells 304 may be snapped together using a standard schematic editor, and power and ground may be connected automatically in a manner to reduce wiring complexity and with connection points that the analog circuit designers can attach circuit elements to if desired. In some embodiments, M_Cells 306 may also be generated by combining additional S_Cells 304 and/or M_Cells 306 to build higher level circuit functionality. As a result, embodiments of the disclosure may not be limited to any specific level of hierarchy. In some embodiments, M_Cells 306 may be represented in schematic form only.

Because AP_Cells 302 do not have specific internal wiring, AP_Cells 302 do not provide any particular functionality, but the specific process information is used for combining with the S_Cells 304 or M_Cells 306 that do have functionality in order to generate process-specific cells that are design rule correct by construction. A cell generator 305 may generate the SP_Cells 308 by executing Process-Specific Cell Generator (PROCELL) software that receives the AP_Cells 302 and S_Cells 304 as inputs. The cell generator 305 may be configured to merge the data from an AP_Cell 302 (that is DRC for a specific process) with an S_Cell 304 (that has a specific wiring/functionality) to generate the corresponding SP_Cell 308 (example shown in FIG. 8). By merging the data from the AP_Cells 302 and S_Cells 304, the SP_Cells 308 may be a specific process representation of the corresponding S_Cell 304. As a result, SP_Cells 308 may be DRC correct and include Fill. SP_Cells 308 may be also checked for Layout versus Schematic (LVS) Correctness and Electrical Rule Correctness (ERC). The SP_Cell 308 may be represented in one or more of a layout, a schematic, a standard netlist, an extracted netlist, or any combination thereof.

Figure 10:
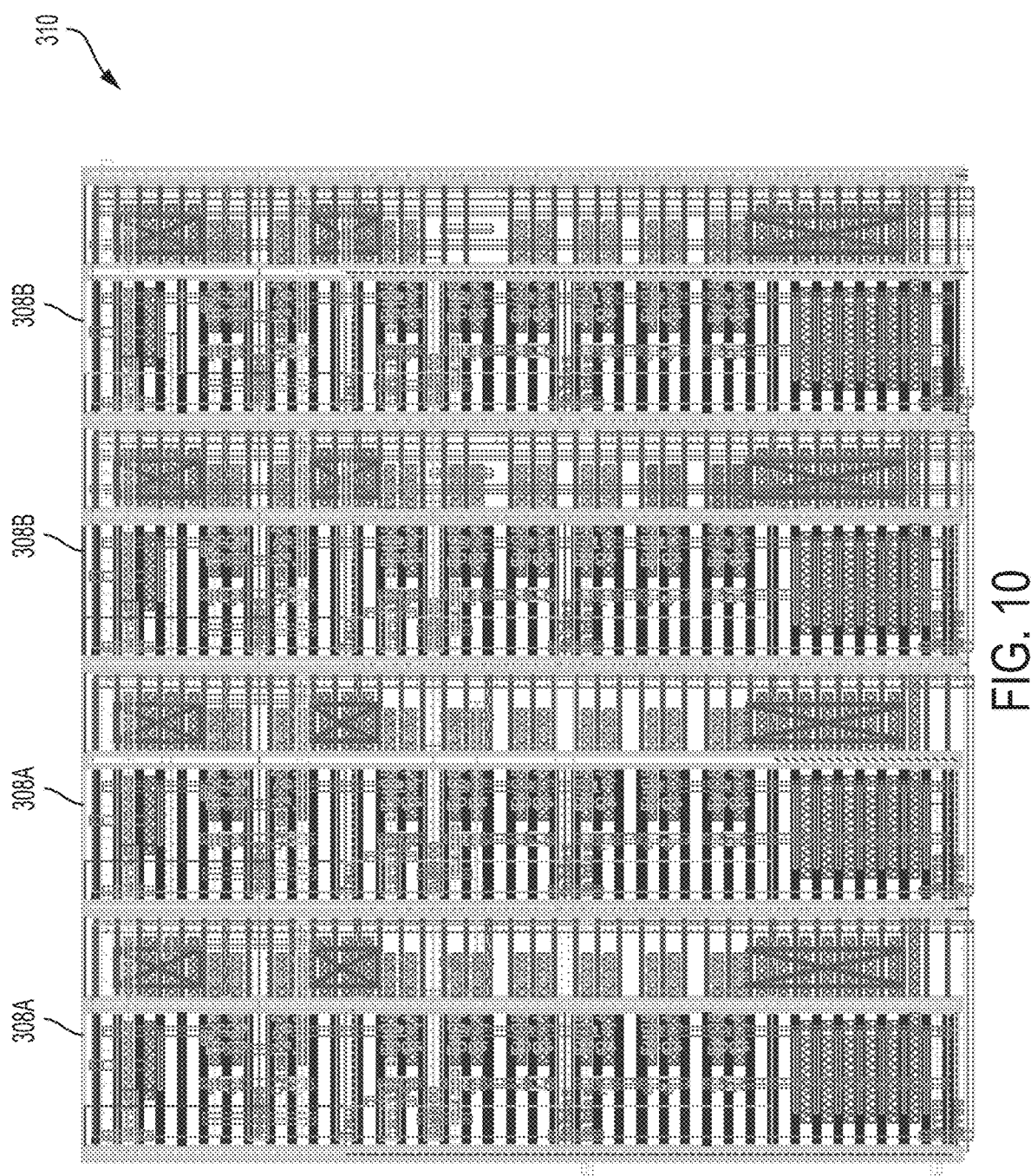
FIG. 10 is an MP_Cell generated from the M_Cell of FIG. 9B according to embodiments of the disclosure.

Similarly, the cell generator 305 may be configured to merge the data from a plurality of AP_Cells 302 (that are DRC for a specific process) with an M_Cell 306 (that has a specific wiring/functionality) to generate an MP_Cell 310 (example shown in FIG. 10). In some embodiments, MP_Cells 310 may be generated by combining SP_Cells 308 that have already been created. Thus, MP_Cells 310 may be created either by combining SP_Cells 308 or converting an M_Cell 306 using the A_Cell data. SP_Cells 308 and/or MP_Cells 310 may also be created manually. Thus, MP_Cells 310 are the process-specific building blocks that have a higher level circuit functionality by combining one or more SP_Cells 308, other MP_Cells 310, or a combination thereof. Examples of various MP_Cells 310 are shown in FIGS. 11-25 discussed below. Each additional level MP_Cell 310 may be represented in layout, schematic, standard netlist, extracted netlist, or any combination thereof. The MP_Cells 310 may be DRC correct and include Fill. As the designer may generate MP_Cells 310 by combining numerous configurations of SP_Cells and/or MP_Cells, the analog circuit designer may be responsible for LVS and ERC.

As discussed above, the computer system 200 used by the analog circuit designer may have a cell library 214 stored in its memory device 210 (or may access a cell library 214 stored remotely). The cell library 214 may be populated with the SP_Cells 308 and MP_Cells 310 for each manufacturing process supported by the computer system 200, which the processor 202 may access when building the physical layout. For example, the cell generator 305 may generate a first set of SP_Cells 308 for a first manufacturing process by applying AP_Cells 302 with a different S_Cells 304 having a variety of different wiring schemes to generate corresponding SP_Cells 308 that may be used when creating complex physical layouts for an IC according to the first manufacturing process. The cell generator 305 may generate a second set of SP_Cells 308 for a second manufacturing process by applying AP_Cells 302 with a different S_Cells 304 having a variety of different wiring schemes to generate corresponding SP_Cells 308 that may be used when creating complex physical layouts for an IC according to the second manufacturing process. Other cells sets may be generated in a similar manner. Each of these cell sets for the different manufacturing processes may be stored in the cell library 214. As a result of having multiple cell sets for different manufacturing processes, the analog circuit designer may be able to create a physical layout easily for different manufacturing processes. Switching processes may be a relatively simple task because each individual pre-stored cell is verified and correct to comply with the design rules for that manufacturing process such that the construction of the physical layout involving connecting individual cells is also correct when they are wired together for the larger IC. For example, an instantiated circuit using the SP_Cells 308 and/or MP_Cells 310 associated with the first semiconductor process A may be converted to the second semiconductor process B by replacing process A's SP_Cells 308 and MP_Cells 310 with process B's SP_Cells 308 and MP_Cells 310 that provide the same functionality.

Figure 3B:
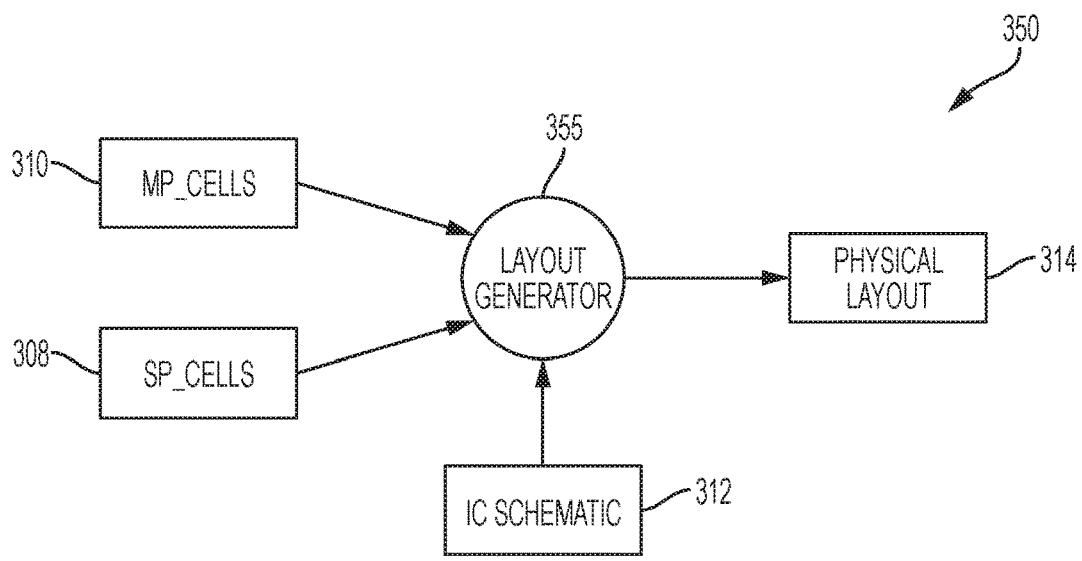
FIG. 3B is a simplified block diagram illustrating elements involved in generating a physical layout for the IC designed by the analog circuit designer using the design tool according to an embodiment of the disclosure.

FIG. 3B is a simplified block diagram 350 illustrating elements involved in generating a physical layout 314 for the IC designed by the analog circuit designer using the design tool 212 (FIG. 2). The analog circuit designer may utilize a schematic editor of the design tool 212 to design the IC schematic 312 that is to be converted to the physical layout 314. The layout generator 355 of the design tool 212 may receive the IC schematic 312 and retrieve corresponding SP_Cells 308 and/or MP_Cells 310 from the cell library 214 (FIG. 2) to automatically build (e.g., compile) the physical layout 314 according to the functionality of the IC schematic 312. The SP_Cells 308 and/or MP_Cells 310 from the cell set that are used to build the physical layout 314 may permit the resistors, capacitors, inductors, diodes, and transistors cells to "snap" together in a design rule compliant way, providing power and ground to every cell, and to permit the user to wire the signals as needed.

In some embodiments, the schematic editor and the layout generator may be integrated within the same design tool, while other embodiments may include separate modules that plug into each other to perform the methodology herein. As an example, the design tool may include the layout generated built as a software package that able to integrate with (e.g., plug into) a schematic editor such as is produced by Cadence Design Systems and its underlying process, layout, and design technology. While the analog circuit designer may view the schematic editor portion of the design tool, the bulk of the layout generator may be implemented at a level hidden from the analog circuit designer. Thus, if analog circuit designers are familiar with design software such as Virtuoso from Cadence Design System, they may also be able to operate the design tool with the analog circuit designer seamlessly. While integration within Cadence Design Systems' software platforms is described, of course integration other commercial tools is contemplated such as those from Synopsis, Mentor Graphics, Silvaco, Tanner Research, and others.

FIG. 4 is a schematic diagram of an A_Cell 301. As discussed above, the A_Cell 301 may include circuit element such as transistors, resistors, inductors, capacitors that are used as a standard cell to construct the AP_Cells 302, SP_Cells 308, and MP_Cells 310. In this example, the A_Cell 301 includes eight transistors that have power and ground connections but are, as of yet, internally not wired for a specific function or built for a specific manufacturing process. The transistors may be further grouped as a first set of P-Type transistors 402 and a second group of N-Type transistors 404. As shown in FIG. 4, there may be an equal number (e.g., 4 each) of P-Type transistors 402 and N-Type transistors 404. However, in some embodiments the A_Cell 301 may include any combination of each transistor type (e.g., 0 N-Type & 8 P-Type, 8 N-Type & 0 P-Type, 1 N-Type & 7 P-Type, and any combination thereof for the given cell size).

Figure 5A:
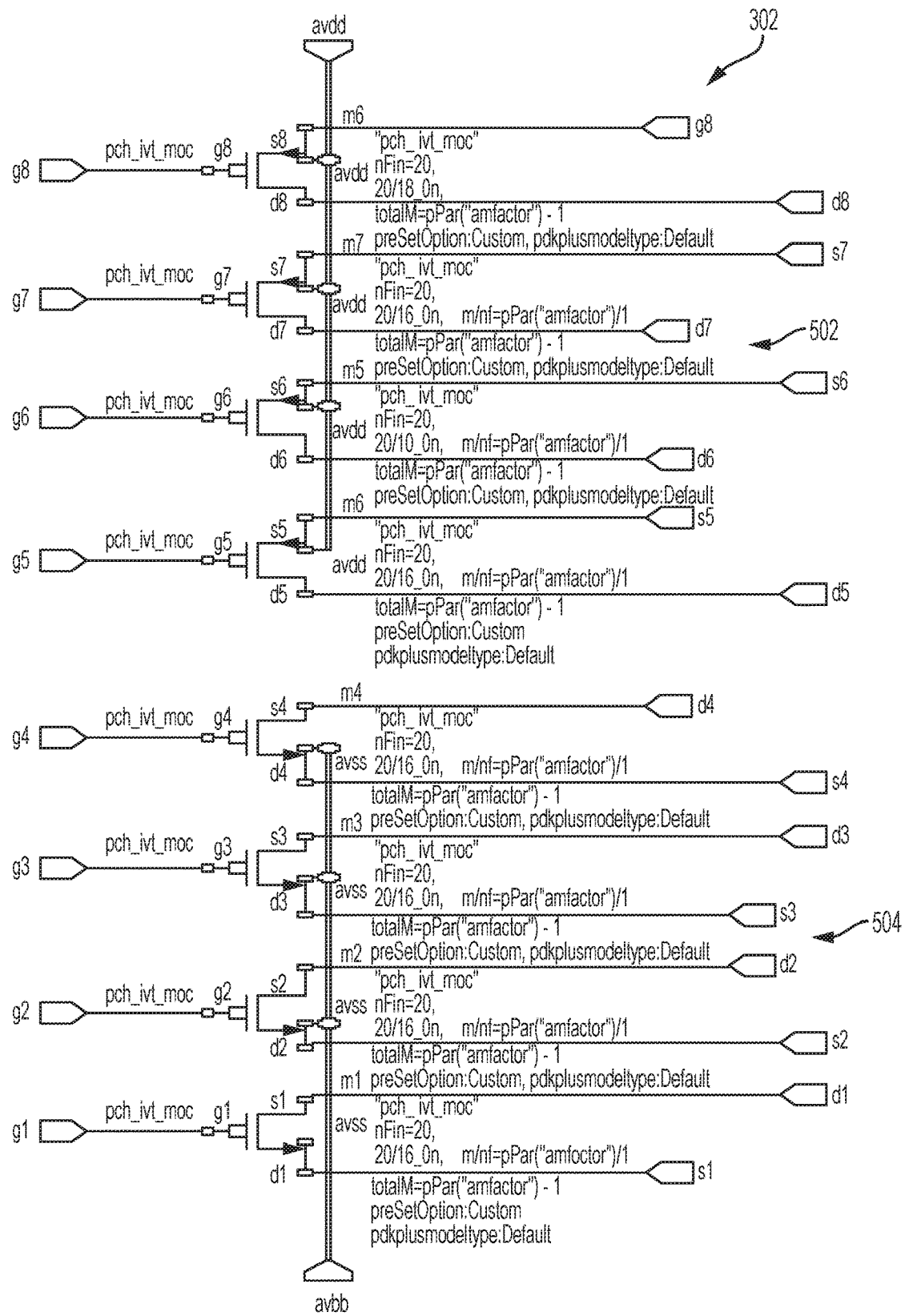
FIGS. 5A-5E are various diagrams of an AP_Cell according to an embodiment of the disclosure.
Figure 5B:
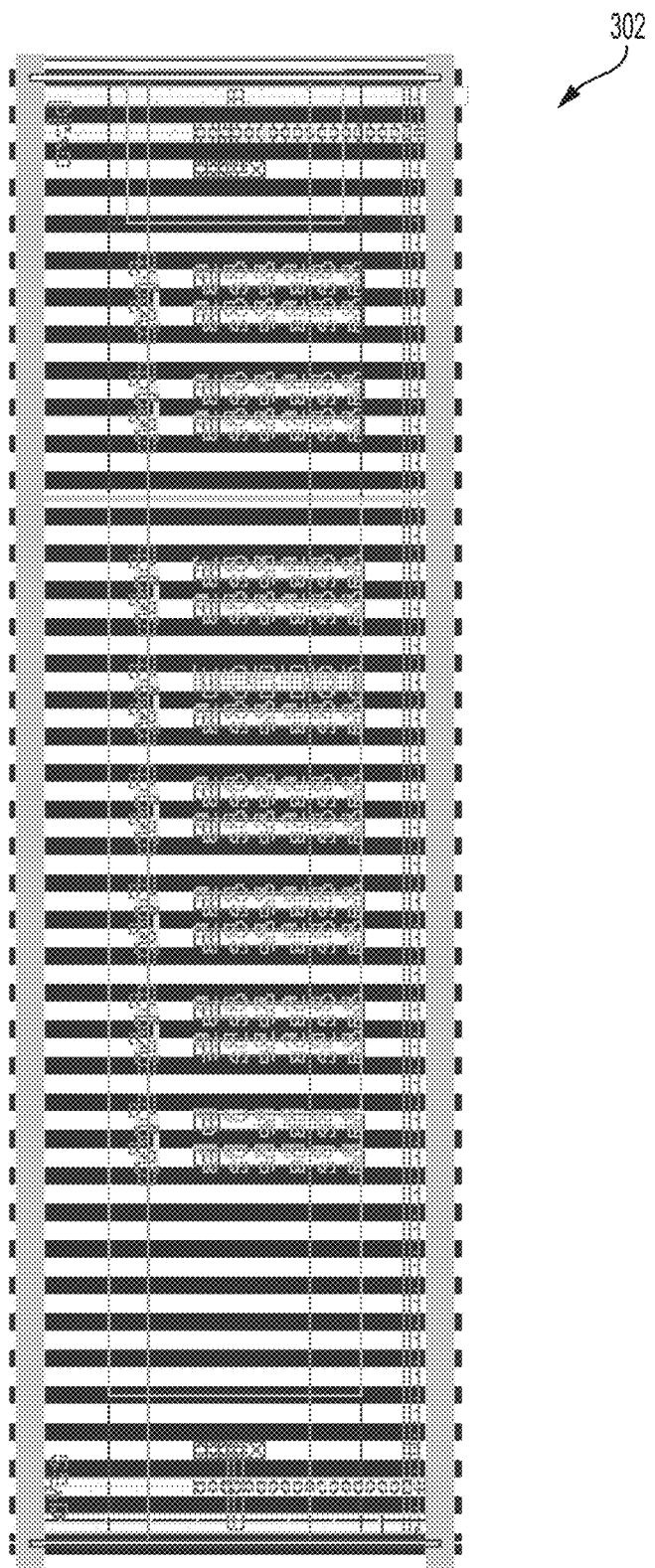
Figure 5C:
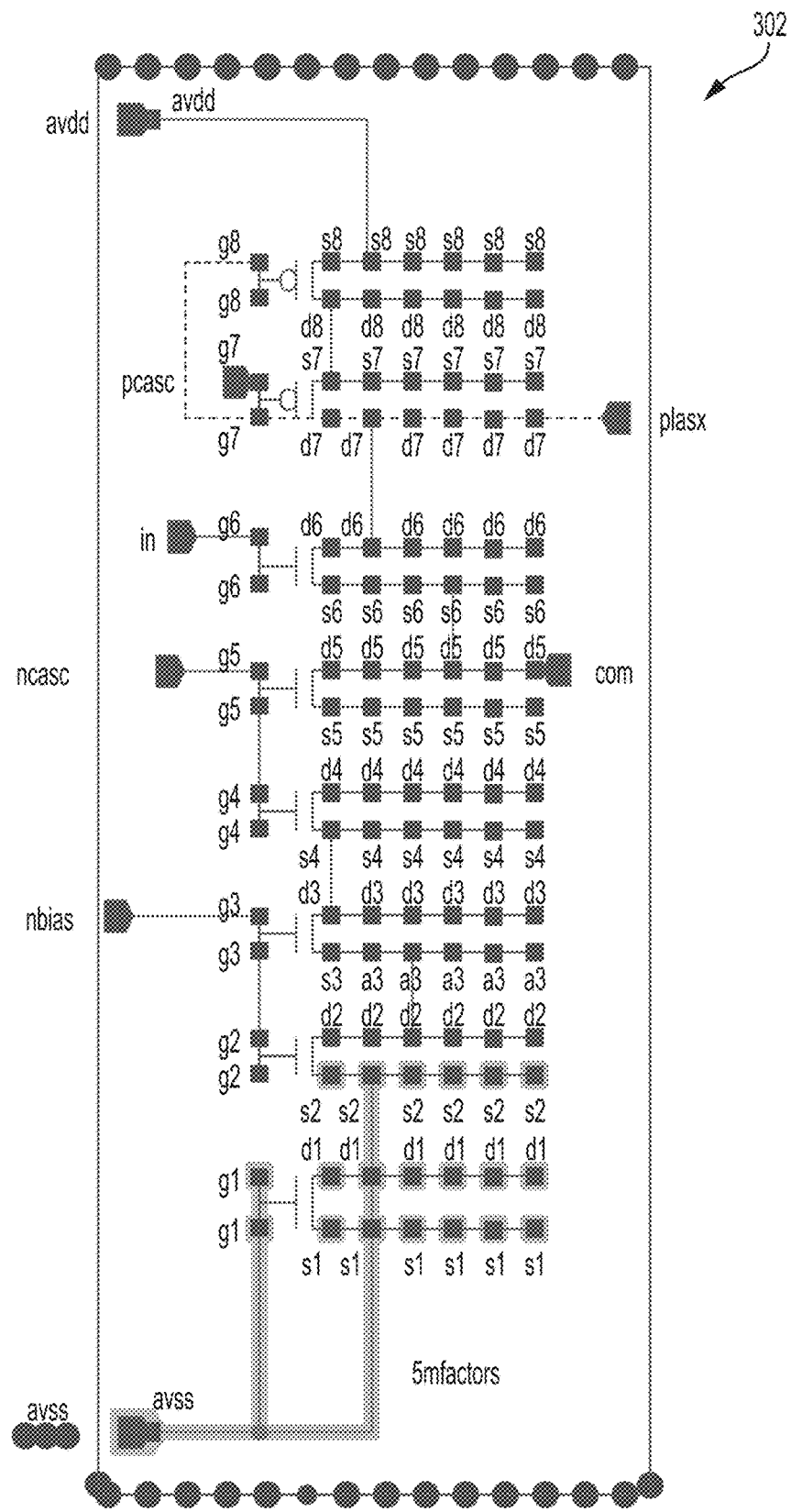

FIGS. 5A-5E are various diagrams of an AP_Cell 302, which is an A_Cell 301 that has been converted to be process specific but still with only attachment points instead of being wired for a particular function. For example, FIG. 5A is a schematic diagram of the AP_Cell 302 showing attachment points for signal, power, and ground wires, as well as process-specific information for the various transistors 502, 504 within the AP_Cell 302. FIGS. 5B and 5C represent the physical layout (including the semiconductor manufacturing layer information) for the AP_Cell 302 from the FIG. 5A schematic. FIG. 5C is the same physical layout as FIG. 5B but with a metal layer removed for a better view of the connections to signal, power, and ground attachment points. It is noted that, for the sake of visibility, some of the manufacturing layers may not be shown in the figures showing physical layouts (e.g., FIGS. 5B-5E, 8, 10, etc.).

Figures 5D, 5E:
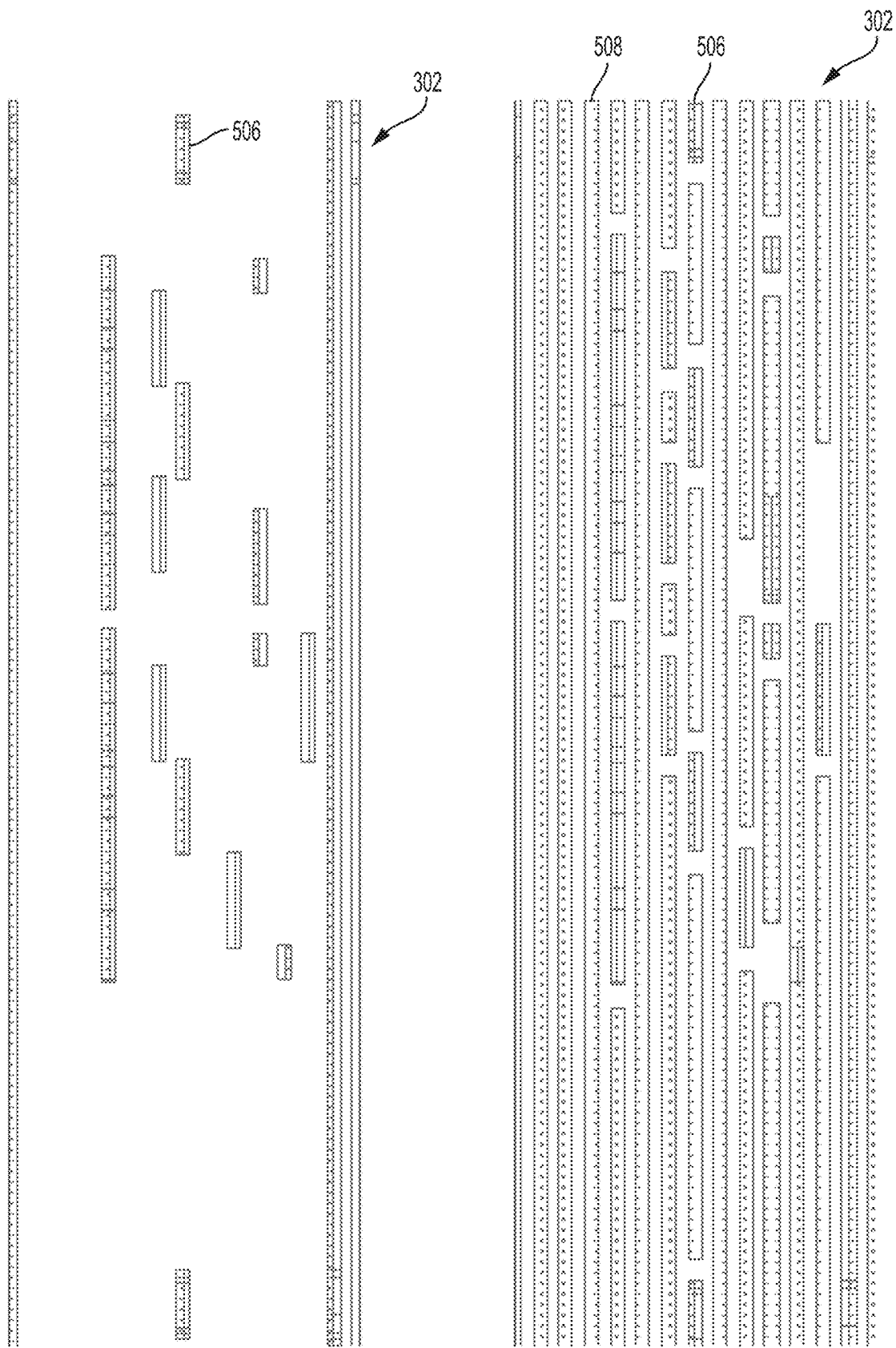

As discussed above, the manufacturing process includes a number of different layers (e.g., typically 20 to 50 or more). To facilitate the photolithography steps in the manufacturing process, elements are added for optical correction, planarization, and other error inducing affects. These elements are added to create a circuit that is designed for manufacturing (often called "FILL" by engineers). FIG. 5D shows a single circuit layer of metal 506 for the AP_Cell 302 without FILL. FIG. 5E shows the same circuit layer with FILL 508 added to fill in empty spaces.

Figure 6:
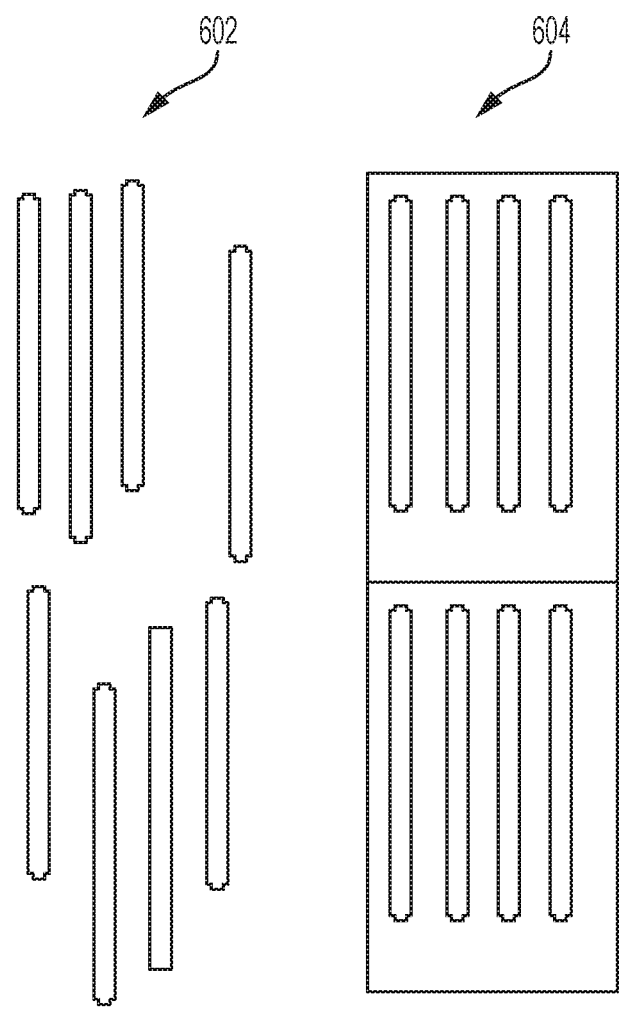
FIG. 6 shows a physical layout for additional circuit elements according to embodiments of the disclosure.

Uniformity of design is critical, but design rules allow engineers to create different size elements with some physical variance. FIG. 6 shows a typical method on the left which is to draw circuit elements 602 in the physical layout where convenient. As can be seen on the left, these circuit elements 602, are not lined up in either columns or rows, creating variance in the photolithography steps. Typical design practice is to have many physical designers on a chip project and thus they may introduce additional variance as the design tools permit the same element to be designed with different widths and lengths and the associated variance of each. On the right side of FIG. 6, are two copies of a single cell for the exact same circuit elements 604 with uniformity in width, length, vertical position, and horizontal position which results in reduced manufacturing process variability, improving circuit yield, reliability, and quality, eliminating all variance due to multiple designers and manufacturing variances.

FIG. 7 is an example of an S_Cell 304. The S_Cell 304 may have the standard set of circuit elements as the A_Cell 301, but has internal wiring to provide a particular function. The S_Cell 304 is also process independent. As discussed above, the S_Cell 304, when combined with an AP_Cell 302, may be used to generate an SP_Cell 308.

Figure 8:
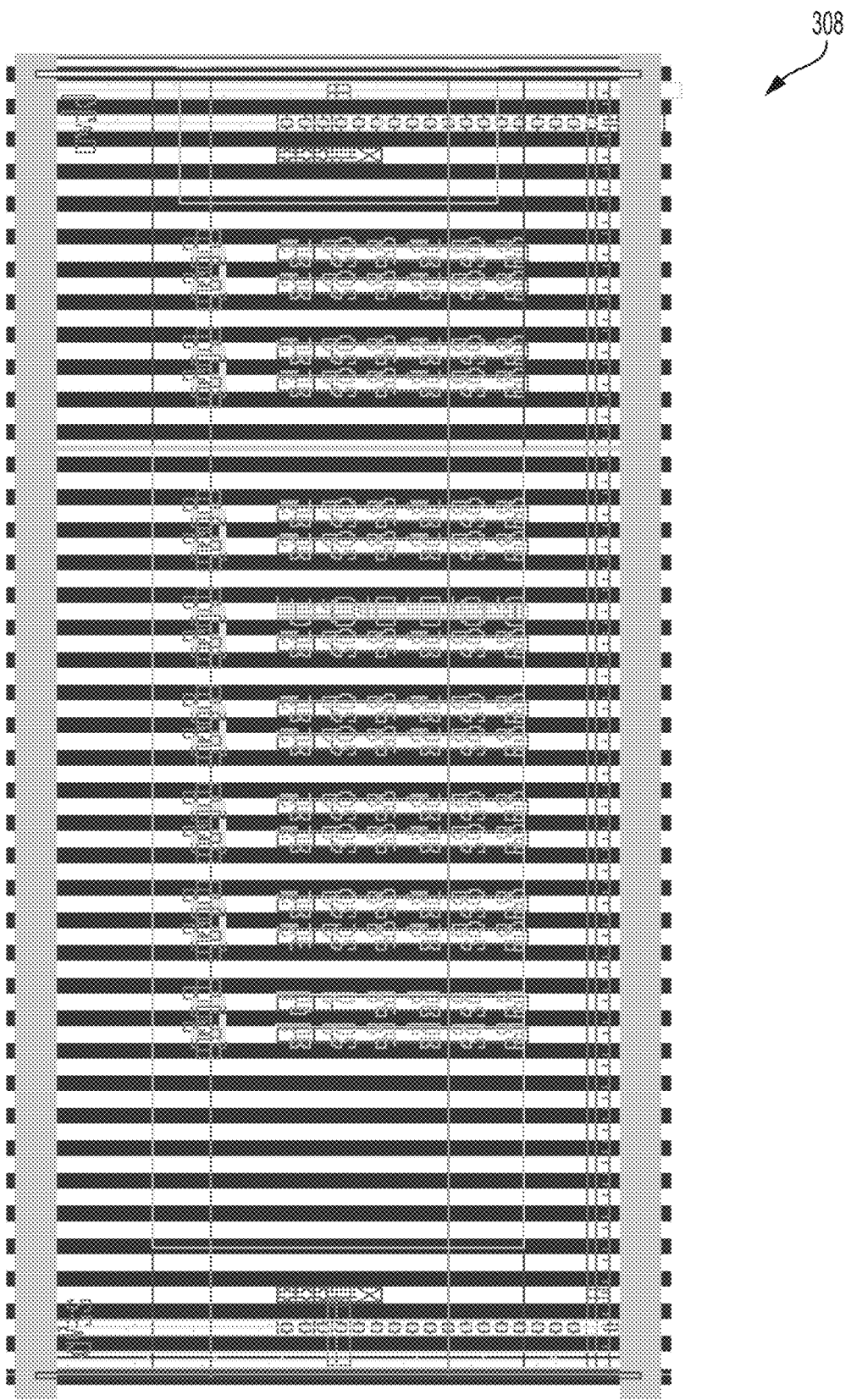
FIG. 8 is an SP_Cell generated according to embodiments of the disclosure.

FIG. 8 is the SP_Cell 308 that was generated using the S_Cell 304 of FIG. 7 and the AP_Cell 302 of FIGS. 5A-5E with the physical layout (e.g., manufacturing instructions) of the SP_Cell 308 containing FILL and being DRC correct. SP_Cells 308 may also be checked for Layout versus Schematic (LVS) correctness and Electrical rule correctness (ERC). The schematic of the SP_Cell 308 may be wired according to the schematic of the S_Cell 304. When generating the SP_Cell 308, the cell generator 305 may also generate a netlist description of the SP_Cell's circuit used for a circuit simulation tool modeling of the SP_Cell 308. The cell generator 305 may also generate an extracted netlist description of the SP_Cell's circuit used for a circuit simulation tool modeling of the cell with all wiring, capacitor, resistor, inductor, and other circuit elements.

Figure 9A:
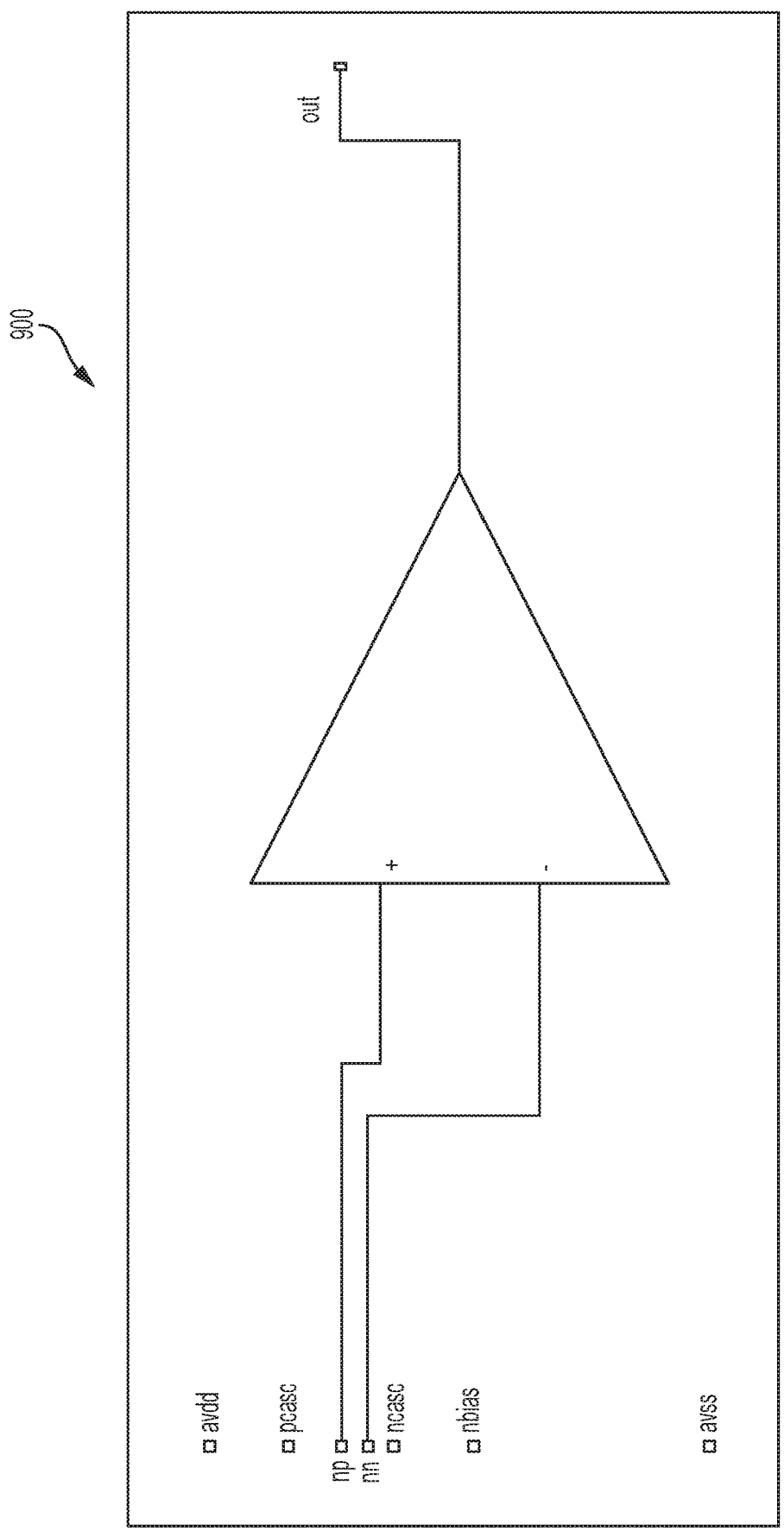
FIGS. 9A and 9B illustrate an M_Cell for an operational amplifier generated according to embodiments of the disclosure.
Figure 9B:
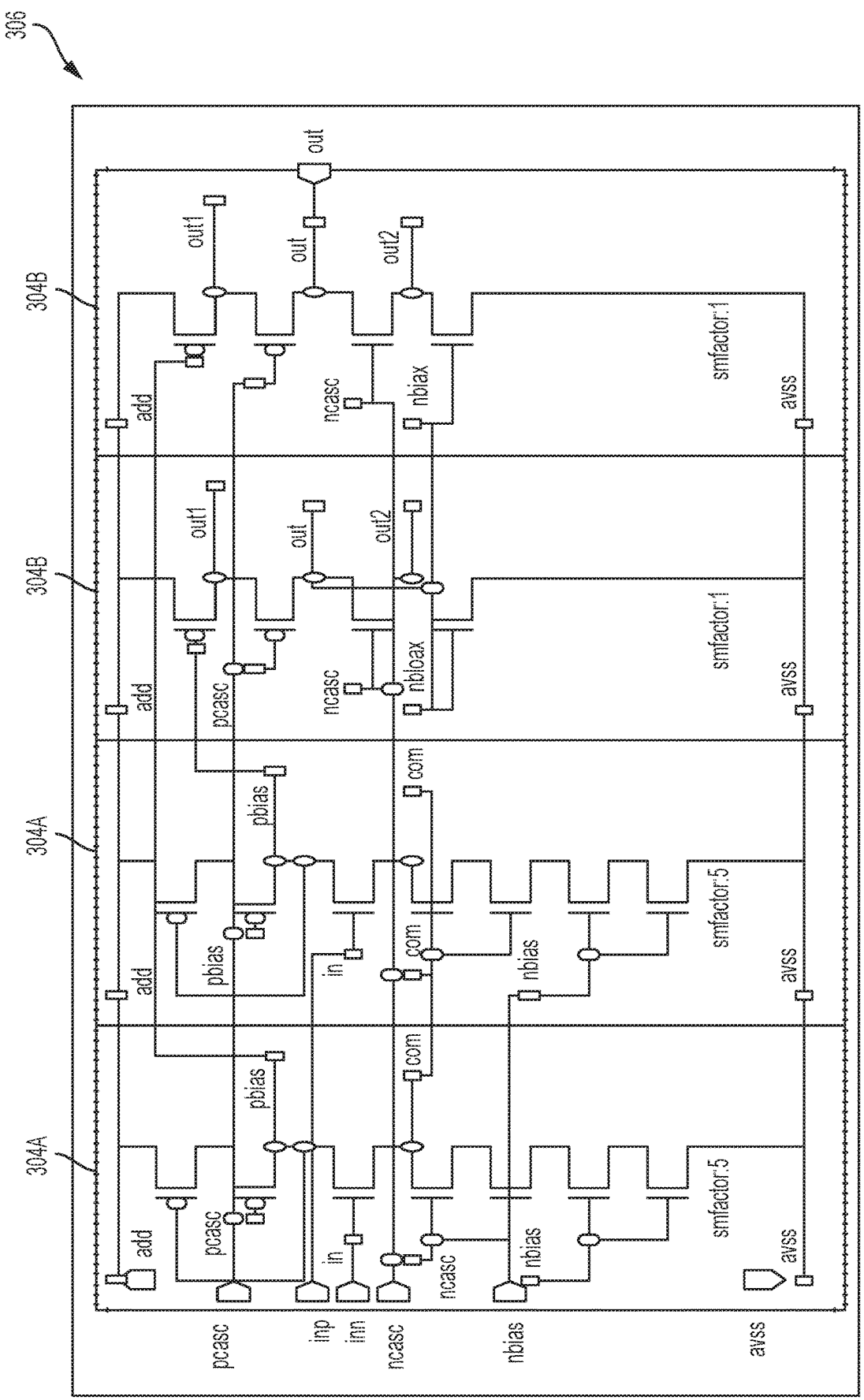

As discussed above, complex circuit functions may be implemented by an M_Cell that comprises multiple S_Cells. FIGS. 9A and 9B illustrate an example of such using an operational amplifier 900. FIG. 9A shows the schematic symbol for the operational amplifier 900, and FIG. 9B shows the M_Cell 306 schematic diagram for the operational amplifier 900. The M_Cell 306 includes a combination of S_Cells 304A, 304B that are connected together when creating the M_Cell 306. In particular, two instances of a first S_Cell 304A may be coupled with two instances of a second S_Cell 304B. The power and ground connections are automatically connected, which reduces wiring complexity of the overall circuit as well as the variability between matching components. As a result, silicon area of the fabricated IC may be reduced.

FIG. 10 is the MP_Cell 310 generated for the M_Cell 306 of FIG. 9B for a particular manufacturing process. In some embodiments, the MP_Cell 310 may be generated by merging the data from the M_Cell 306 with the AP_Cell 302 corresponding to the desired manufacturing process. In other embodiments, the MP_Cell 310 may be generated by combining multiple SP_Cells 308 for the desired manufacturing process to perform a more complex function.

FIGS. 11A through 24 are block diagrams showing various additional circuits that are built using different combinations of SP_Cells 308 and/or MP_Cells 310. These additional circuits may themselves be saved in the cell library 214 as new MP_Cells 310 for future use when generating the physical layout, or in some cases may simply be automatically generated during the physical layout generation by retrieving the appropriate SP_Cells 308 and/or MP_Cells 310 when compiling the schematic layout created by the analog circuit designer. FIGS. 11A through 16 show various OpAmp constructions that may each have different characteristics. An analog circuit designer may, therefore, have flexibility to swap out different OpAmps that are verified and DRC on an individual basis without having to perform a substantial redesign of the rest of the IC.

Figure 11A:
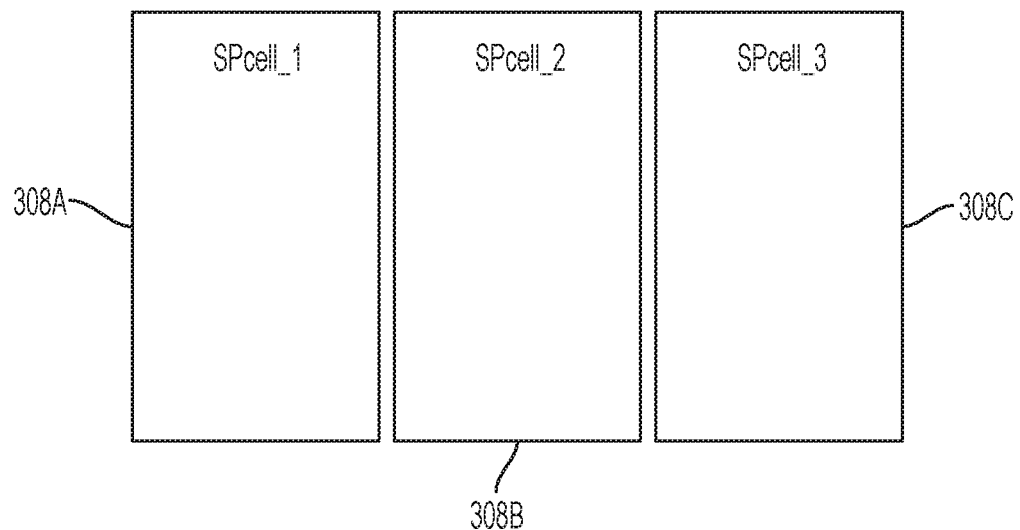
FIGS. 11A through 24 are block diagrams showing various additional circuits that are built using different combinations of SP_Cells and/or MP_Cells according to embodiments of the disclosure.
Figure 11B:
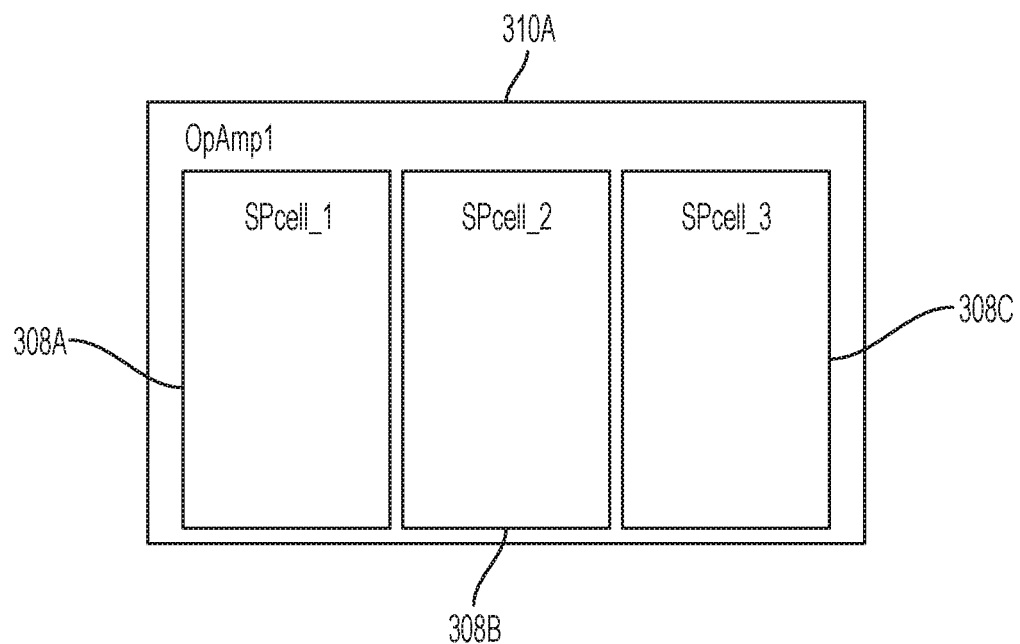

FIG. 11A shows different SP_Cells 308A, 308B, 308C that may be retrieved from the cell library 214 to build a more complex circuit (e.g., an OpAmp). In particular, a first SP_Cell 308A, a second SP_Cell 308B, and a third SP_Cell 308C may be stored in the cell library 214 after having been configured for a particular process and standard layout scheme such that any combination of these cells together, along with the wiring for power and ground, will be connected together and will be DRC correct. The layout generator 355 may then combine the SP_Cells 308A, 308B, 308C such that the wiring (e.g., input, output, and internal) is automatically generated during the physical layout generation in a manner that satisfies the functionality requirements set by the analog circuit designer. A new MP_Cell 310A may be created and saved using the SP_Cells 308A, 308B, 308C as shown in FIG. 11B. The new MP_Cell 310A may have a specific function associated therewith (e.g., OpAmp1). In this example, a first OpAmp 310A may be generated using three SP_Cells 380A, 380B, 380C.

Figure 12A:
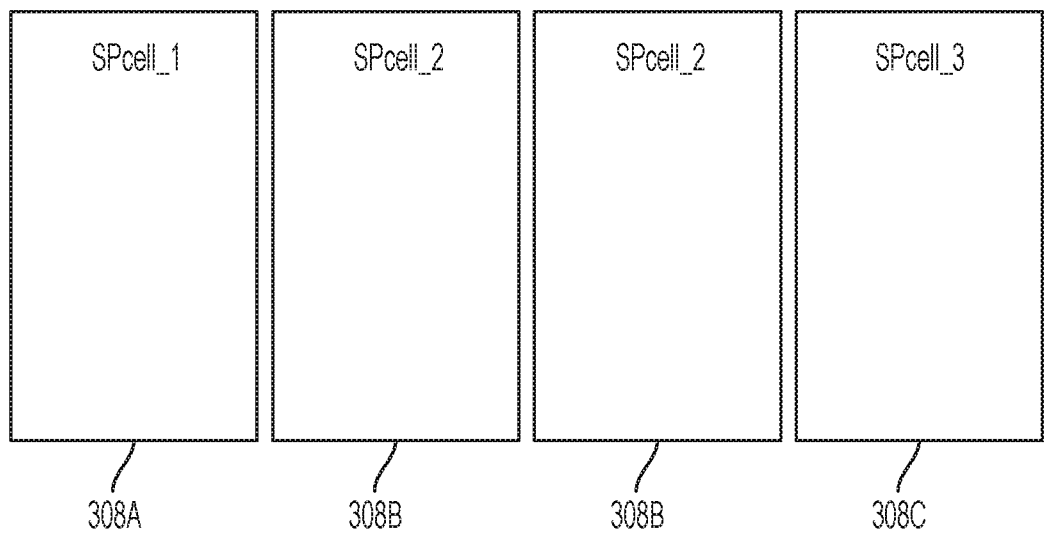
Figure 12B:
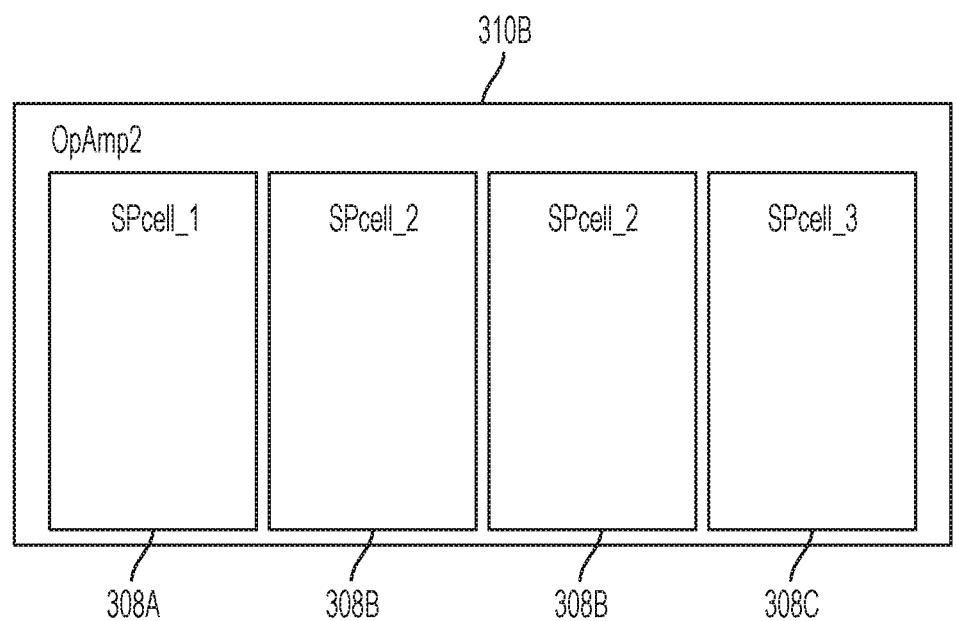

FIG. 12A shows different SP_Cells 308A, 308B, 308B, 308C that may be retrieved from the cell library 214 to build a more complex circuit (e.g., an OpAmp). In particular, a first SP_Cell 308A, two instances of a second SP_Cell 308B, a third SP_Cell 308C may be stored in the cell library 214 after having been configured for a particular process and standard layout scheme such that any combination of these cells together, along with the wiring for power and ground, will be connected together and will be DRC correct. The layout generator 355 may then combine the SP_Cells 308A, 308B, 308B, 308C such that the wiring (e.g., input, output, and internal) is automatically generated during the physical layout generation in a manner that satisfies the functionality requirements set by the analog circuit designer. A new MP_Cell 310B may be created and saved using the SP_Cells 308A, 308B, 308B, 308C as shown in FIG. 12B. The new MP_Cell 310B may have a specific function associated therewith (e.g., OpAmp2). In this example, a second OpAmp 310B may be generated using four SP_Cells 380A, 380B, 380B, 380C.

Figure 13:
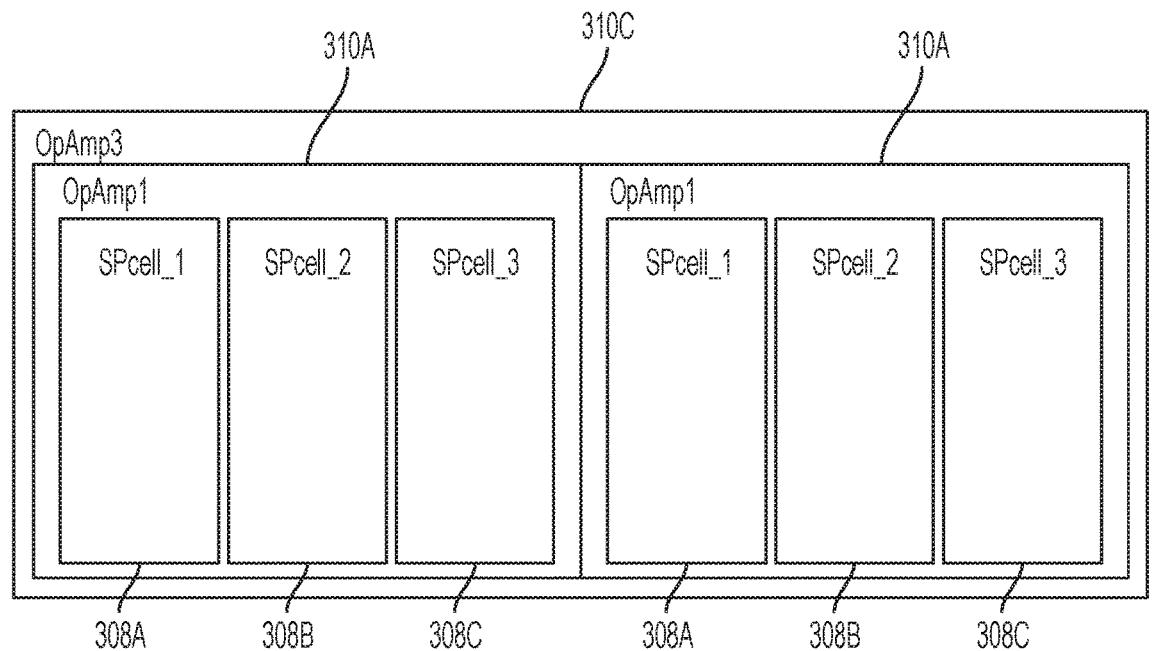

FIG. 13 shows two instances of the same MP_Cell 310A that may be retrieved from the cell library 214 to build a more complex circuit (e.g., an OpAmp). In particular, the first MP_Cell 310A (e.g., OpAmp1) and another instance of the first MP_Cell 310A (e.g., OpAmp1) may be connected together and will be DRC correct as discussed above. The layout generator 355 may then combine the MP_Cells 310A, 310A such that the wiring (e.g., input, output, and internal) is automatically generated during the physical layout generation in a manner that satisfies the functionality requirements set by the analog circuit designer. A new MP_Cell 310C may be created and saved using the MP_Cells 310A, 310A. The new MP_Cell 310C may have a specific function associated therewith (e.g., OpAmp3). In this example, a third OpAmp 310C may be generated using two instances of the same MP_Cell 310A.

Figure 14:
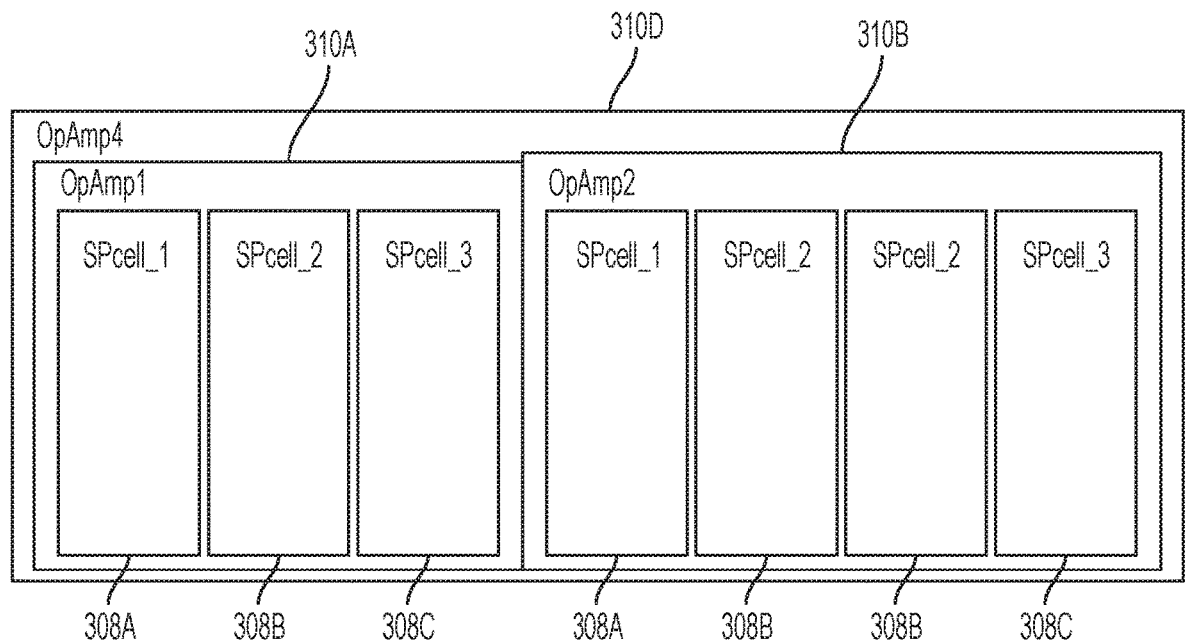

FIG. 14 shows different MP_Cells 310A, 310B that may be retrieved from the cell library 214 to build a more complex circuit (e.g., an OpAmp). In particular, the first MP_Cell 310A (e.g., OpAmp1) and the second MP_Cell 310B (e.g., OpAmp2) may be connected together and will be DRC correct as discussed above. The layout generator 355 may then combine the MP_Cells 310A, 310B such that the wiring (e.g., input, output, and internal) is automatically generated during the physical layout generation in a manner that satisfies the functionality requirements set by the analog circuit designer. A new MP_Cell 310D may be created and saved using the MP_Cells 310A, 310B. The new MP_Cell 310D may have a specific function associated therewith (e.g., OpAmp4). In this example, the fourth OpAmp 310D may be generated using two different MP_Cells 310A, 310B.

Figure 15:
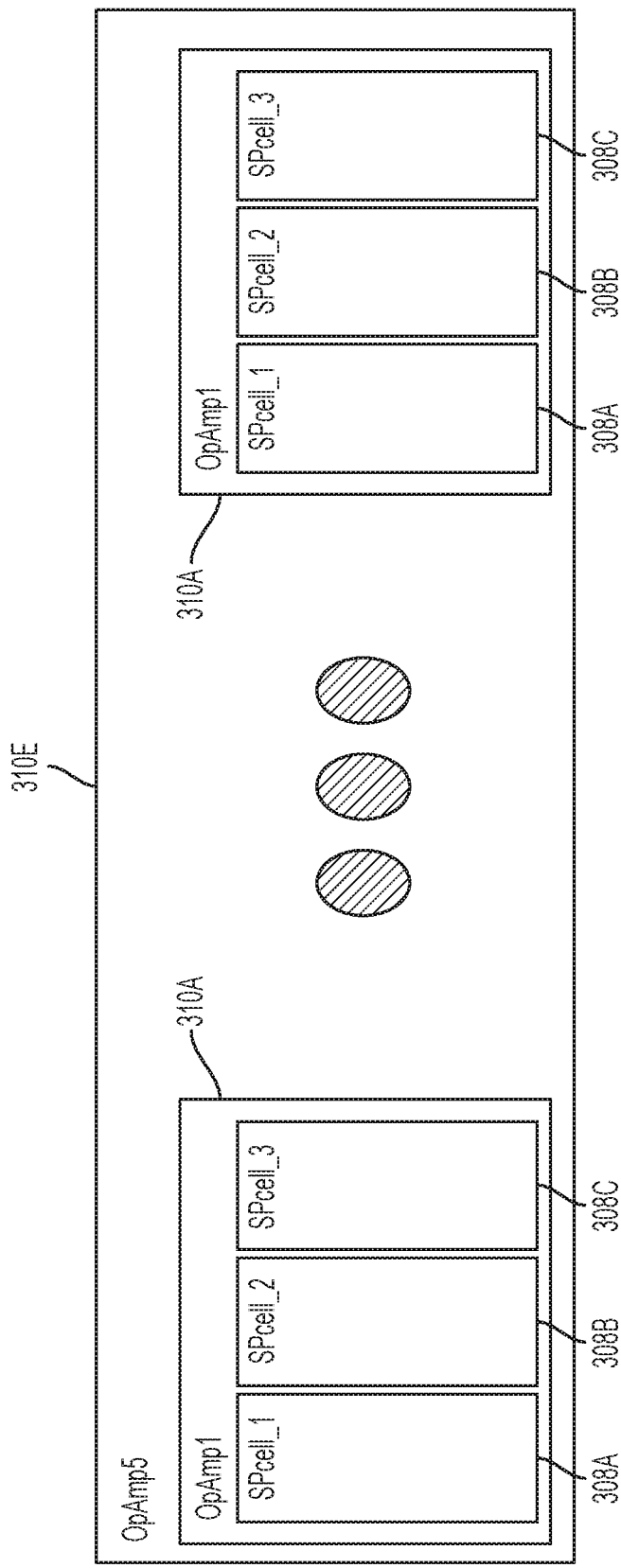

FIG. 15 shows that additional variations of OpAmps may be created by using multiple OpAmp configurations, such as MP_Cells 310A, 310A in combination with other SP_Cells and/or MP_Cells to create a new MP_Cell 310E (e.g., OpAmp5).

Figure 16:
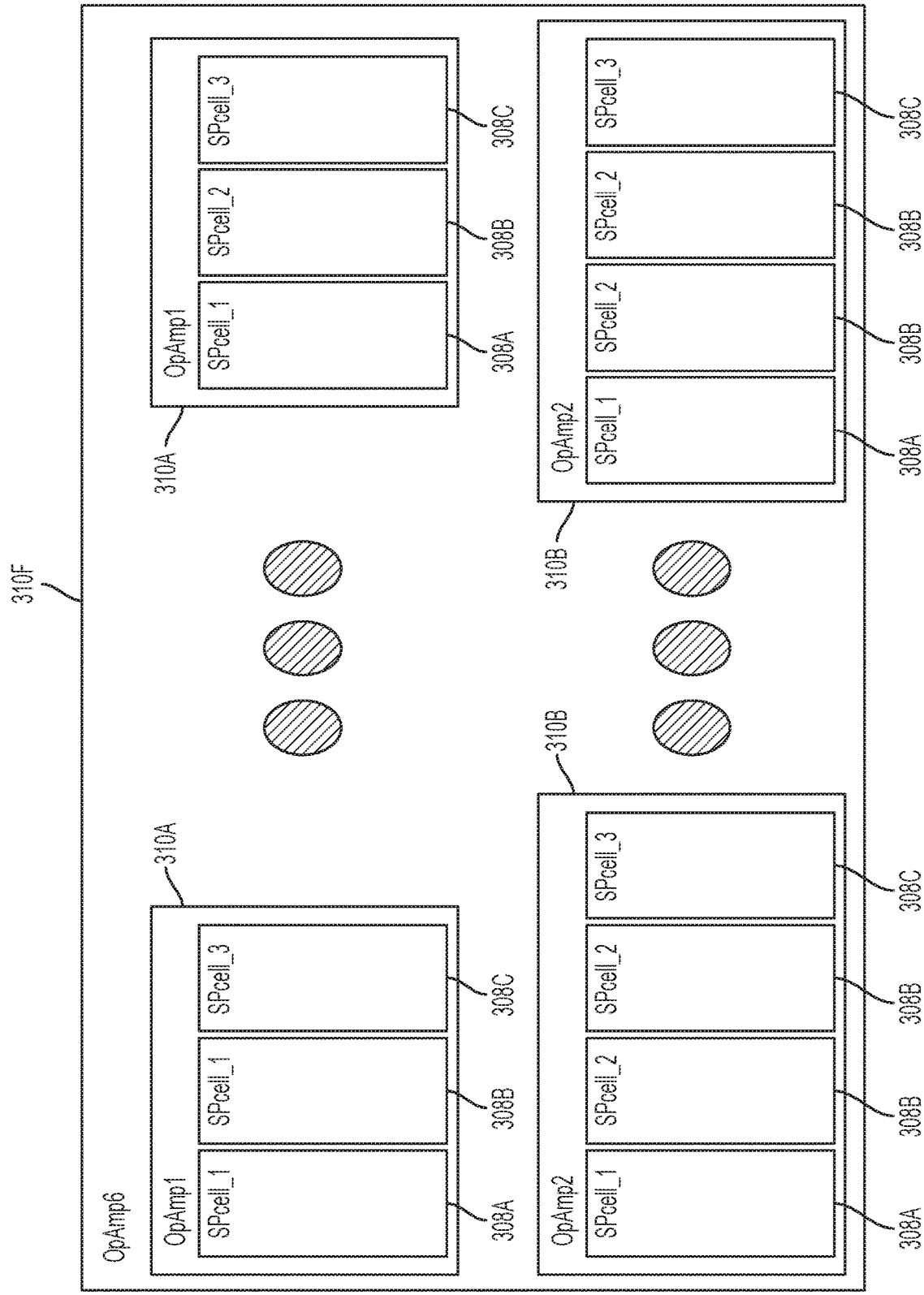

FIG. 15 shows that additional variations of OpAmps may be created by using multiple OpAmp configurations, such as MP_Cells 310A, 310A in combination with other SP_Cells and/or MP_Cells to create a new MP_Cell 310E (e.g., OpAmp5). Similarly, FIG. 16 shows a new MP_Cell 310E (e.g., OpAmp6) created by combining 2 to N MP_Cells 310A (e.g., OpAmp1) and 2 to M MP_Cells 310B (e.g., OpAmp2). In each case, all MP_Cells and SP_Cells shall be DRC and LVS clean by construction with power and ground provided and the analog circuit designer shall only need to wire the inputs, outputs, and internal signal wires.

FIGS. 17 through 24 are simplified block diagrams for different types of circuits that may be built using cell sets according to embodiments of the disclosure. In particular, FIGS. 17 through 24 show a variety of Analog to Digital converters (ADCs) being built by combining one or more MP_Cells and/or SP_Cells to create a circuit with a more complex function. The blocks represent the respective cells that may be retrieved and combined to form a physical layout responsive to an analog circuit designer creating a schematic layout with a schematic editor of a design tool.

Figure 17:
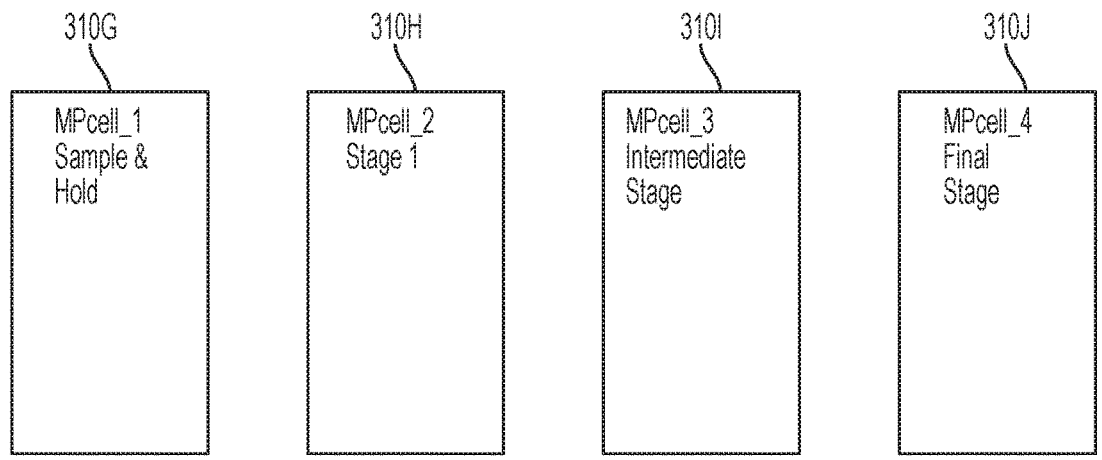
Figure 18:
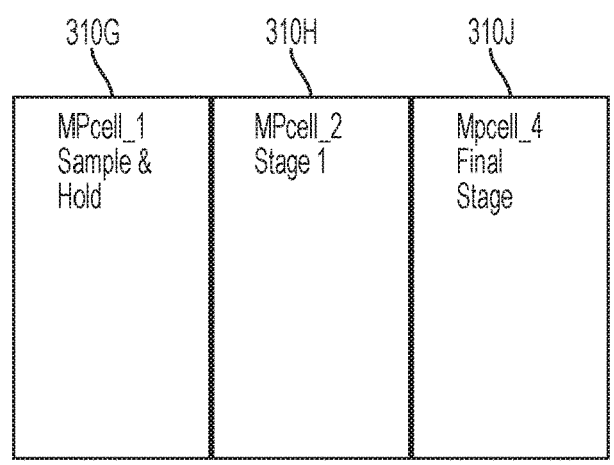
Figure 19:
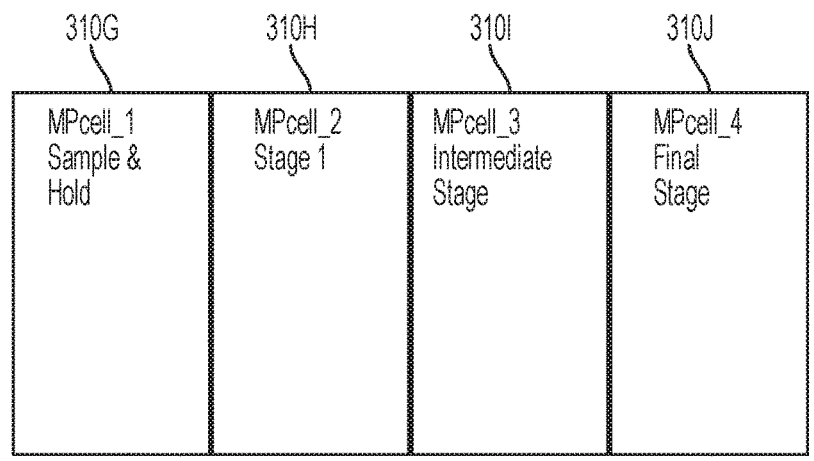
Figure 20:
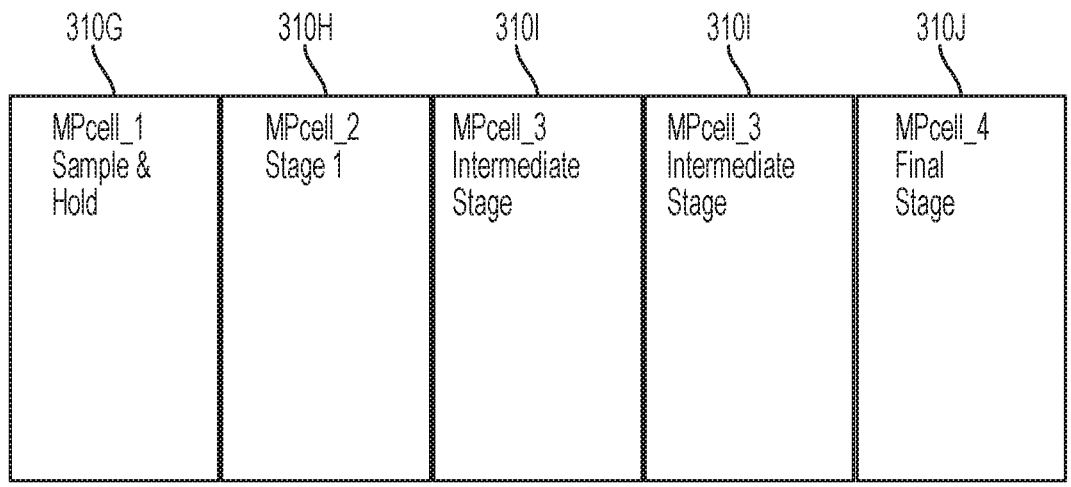

FIG. 17 shows four building blocks for an ADC using a pipelined architecture and built using multiple stages. Such an ADC may be constructed by the system using MP_Cells 310G, 310H, 310I, 310J. MP_Cell 310G may be configured to be a sample and hold circuit. MP_Cell 310H may be configured as a first stage for the pipelined architecture of the ADC. MP_Cell 310I may be configured as an intermediate stage for the pipelined architecture of the ADC. MP_Cell 310J may be configured as a final stage for the pipelined architecture of the ADC. FIG. 18 shows a simplified version of an ADC using the MP_Cells 310G, 310H, 310J, which may be sufficient depending on the required performance of the ADC. FIG. 19 shows a version of the ADC using the MP_Cells 310G, 310H, 310J, as well as MP_Cell 310I for the intermediate stage, which may result in greater accuracy of the input signal at the expense of using more power. FIG. 20 shows a version of the ADC with multiple intermediate stages, such that more than one instance of MP_Cell 310I may be used to further increase the accuracy of the ADC. These examples are non-limiting, and it is contemplated that additional ADC pipelined circuits may be constructed through various combinations of the MP_Cells 310G, 310H, 310I, 310 or other variations thereof.

Figure 21:
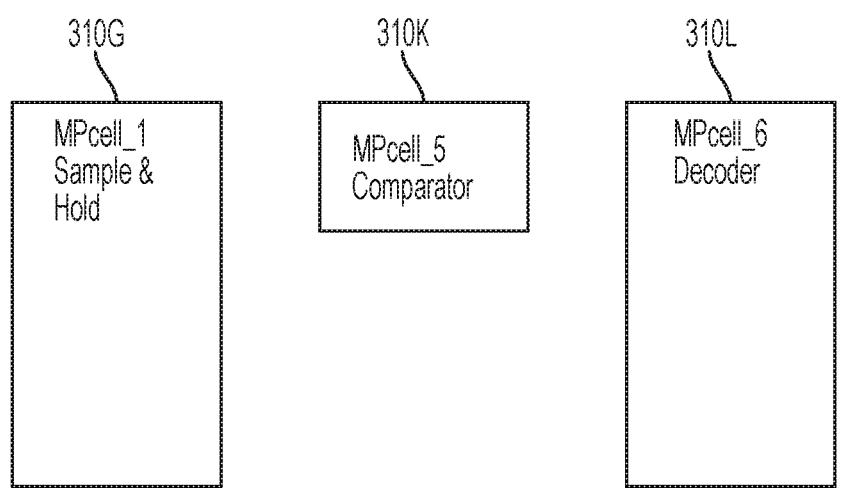

FIGS. 21 through 24 show a simplified version of another variety of ADC called a FLASH ADC. FIG. 21 shows three building blocks for an ADC using the FLASH architecture. Such an ADC may be constructed by the system using MP_Cells 310G, 310K, 310L. MP_Cell 310G may be configured to be a sample and hold circuit. MP_Cell 310K may be configured as a comparator for the FLASH ADC. MP_Cell 310L may be configured as a decoder for the FLASH ADC. Note that MP_Cell 310G may be an instance of the same MP_Cell used in the pipelined architecture. FLASH ADC's may typically be faster than pipelined ADCs, but have lower bit resolutions and use more power as each additional bit requires twice as many comparators (MP_Cells 310K).

Figure 22:
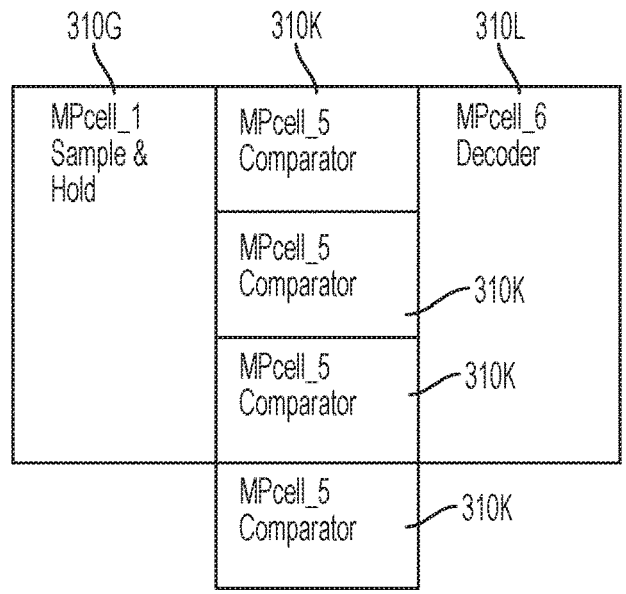
Figure 23:
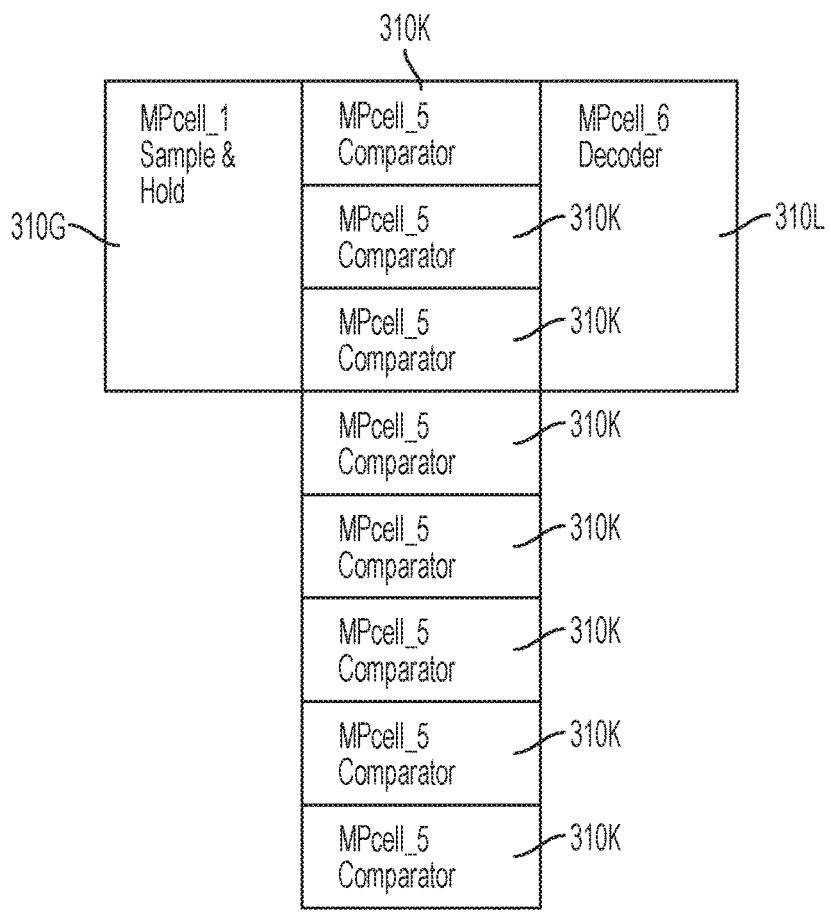
Figure 24:
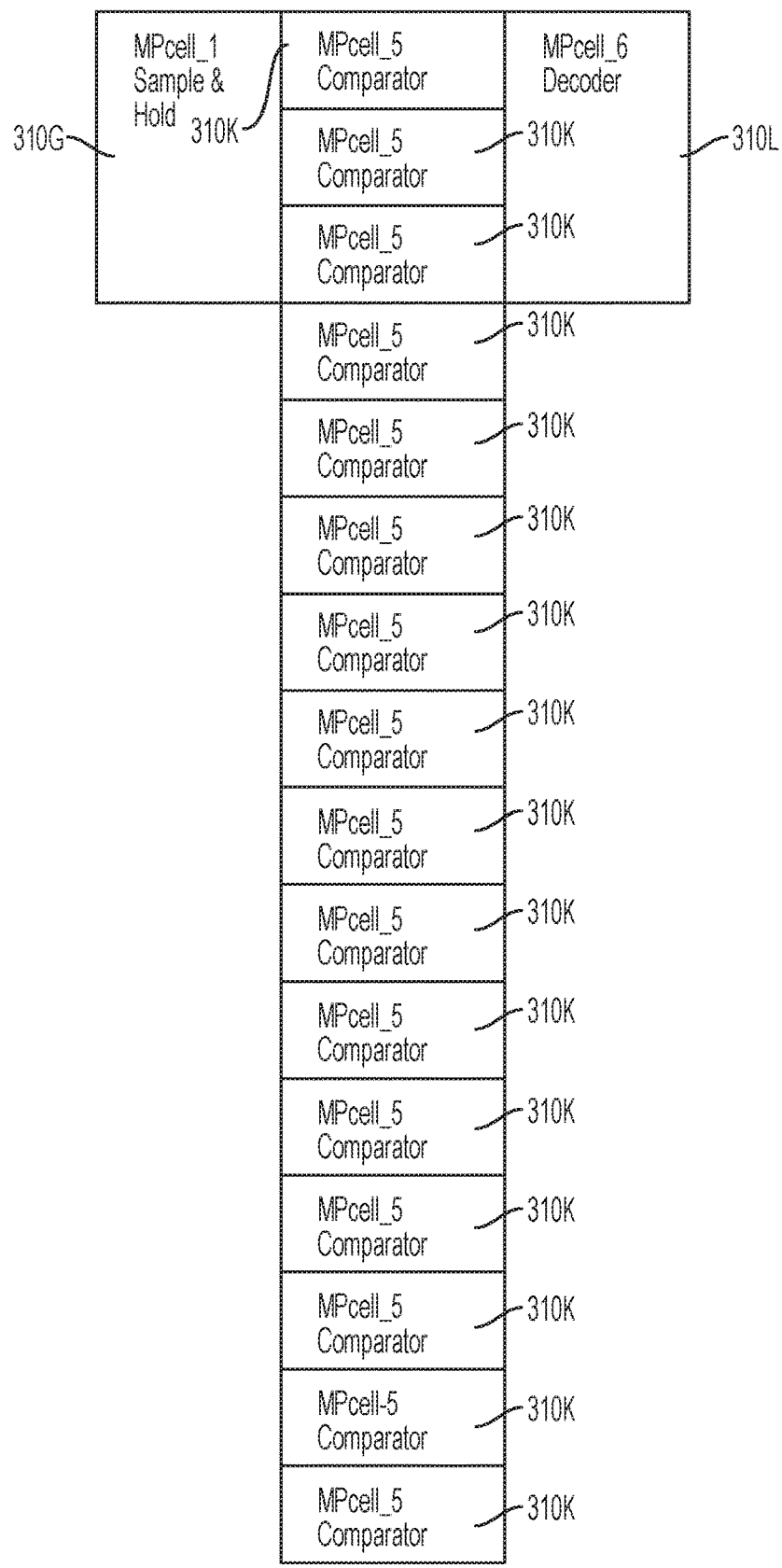
Figure 5B:
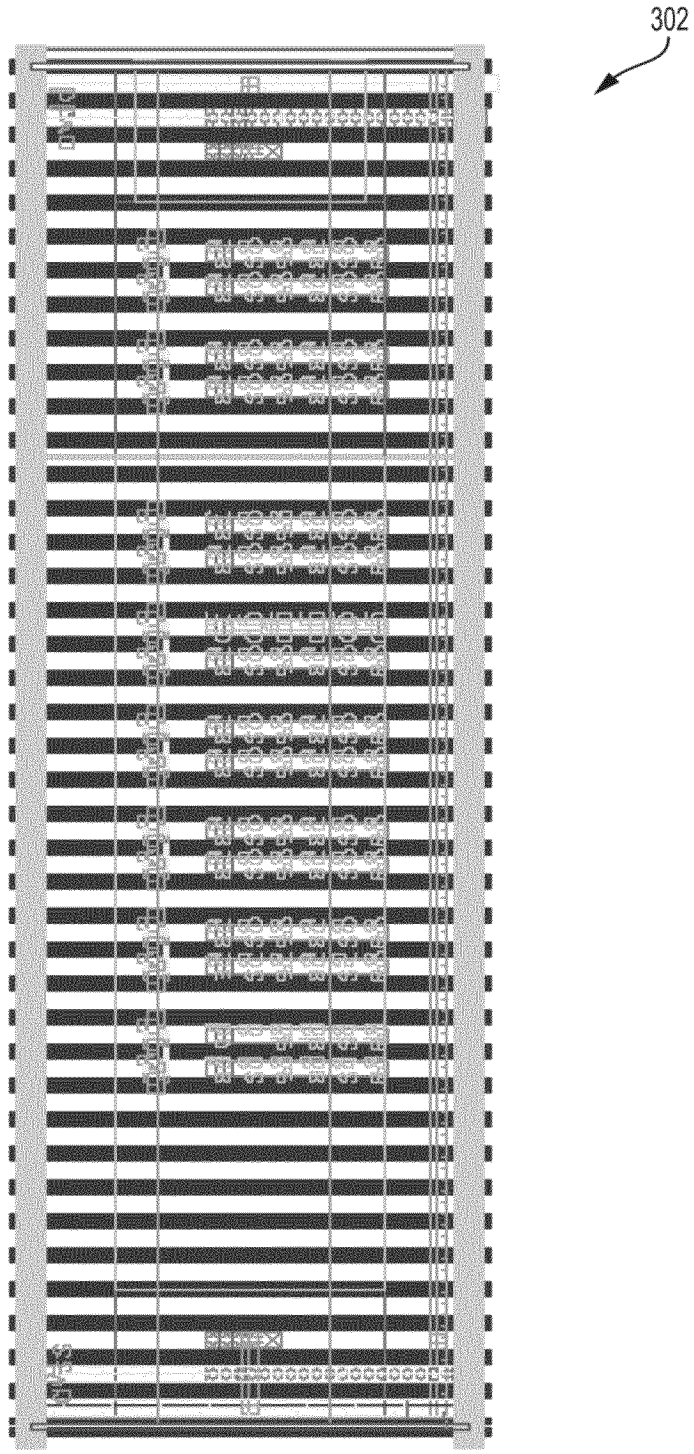
Figure 5C:
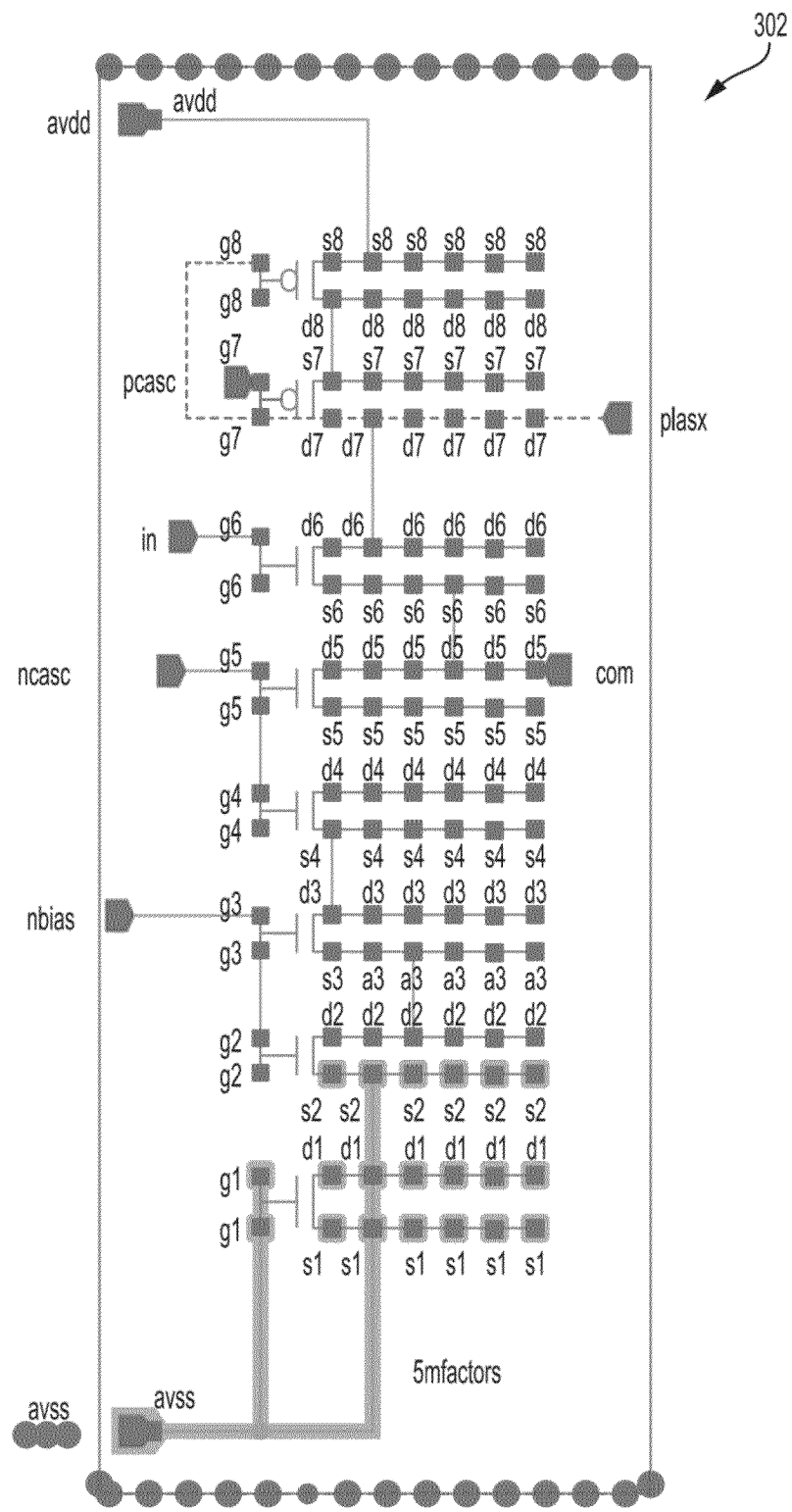
Figures 5D, 5E:
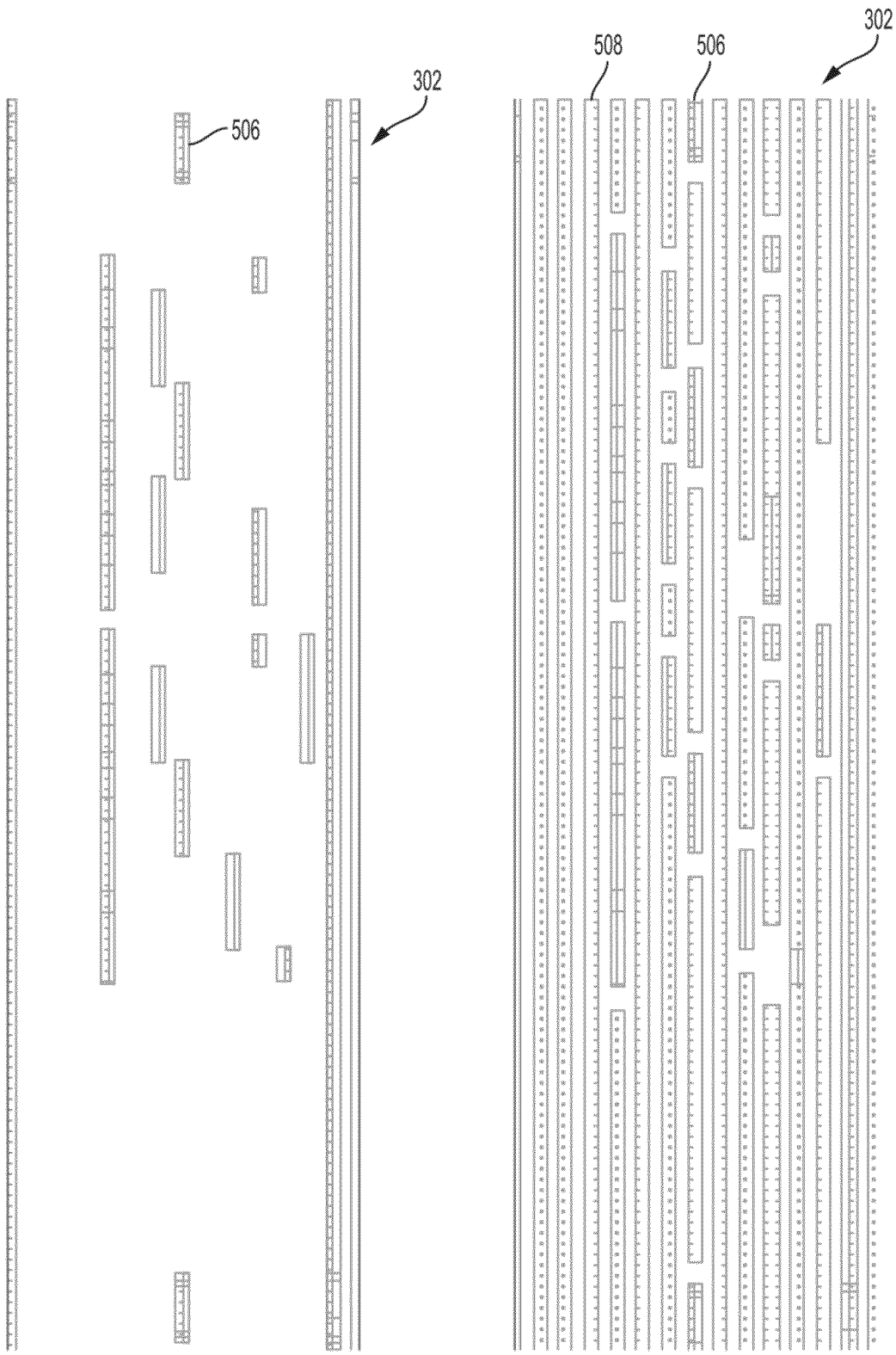
Figure 8:
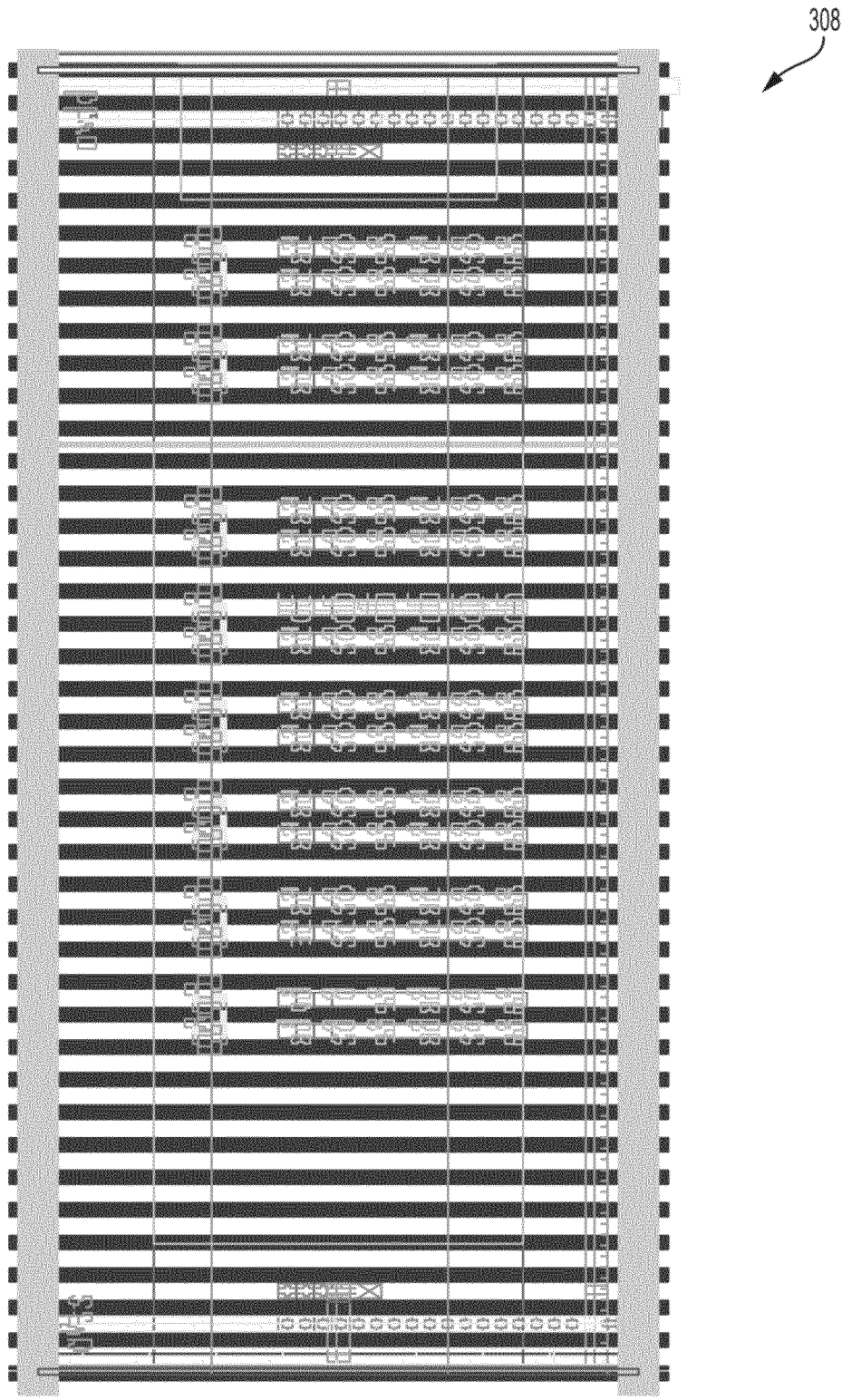
Figure 10:
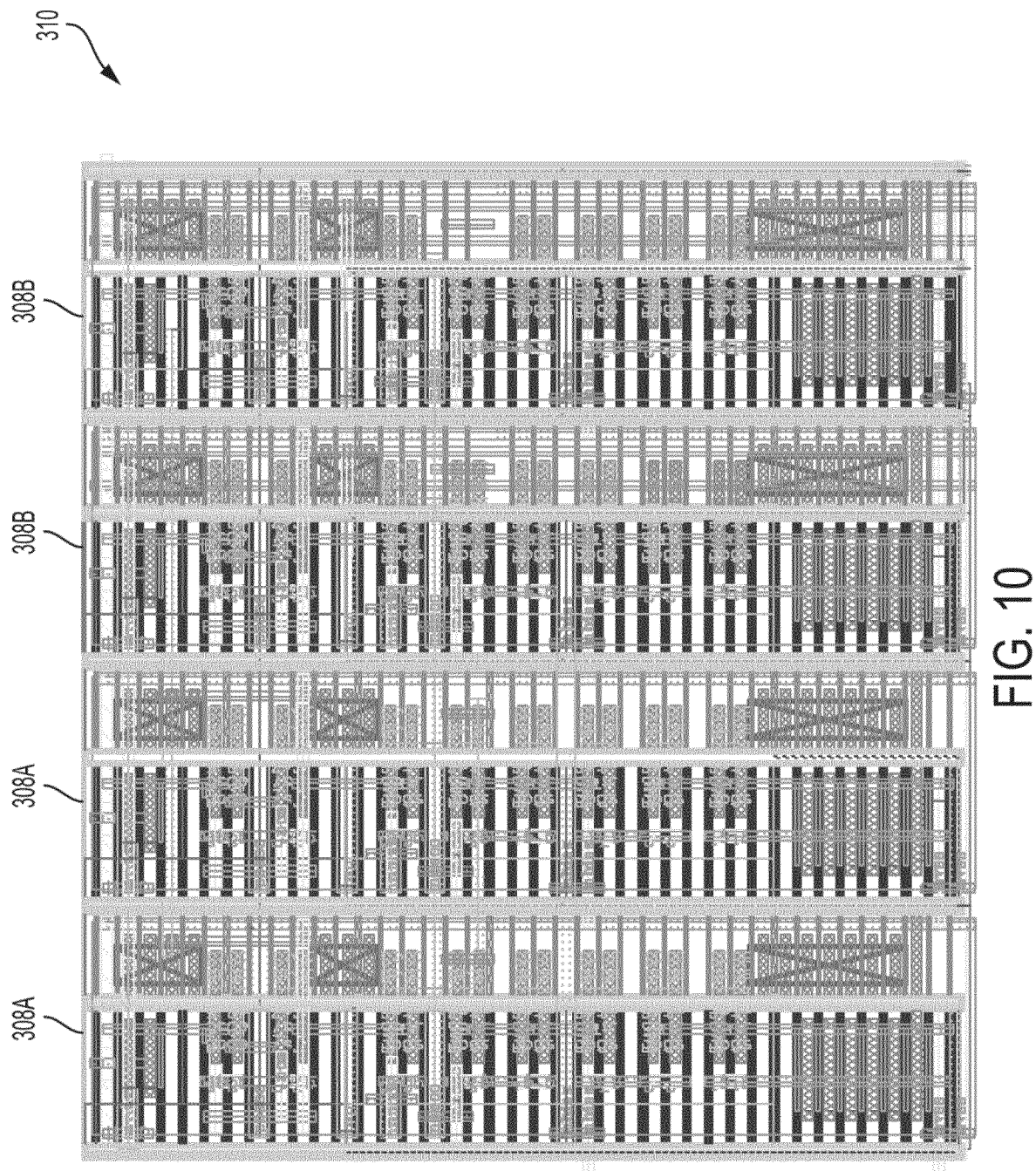

FIG. 22 shows a simplified version of a FLASH ADC using the MP_Cells 310G, 310K, 310L, which may be sufficient depending on the required performance of the ADC. In the example of FIG. 22, the FLASH ADC may include four instances of the MP_Cell 310K comparator blocks. Additional configurations are also contemplated in which different numbers of MP_Cell 310K comparator blocks are used. For example, the FLASH ADC of FIG. 23 includes eight MP_Cell 310K comparator blocks, and the FLASH ADC of FIG. 24 includes sixteen MP_Cell 310K comparator blocks. This technique may be used to increase the FLASH ADCs by any number desired.

In addition to OpAmps, comparators, ADCs, other circuit functions are also contemplated for creating a cell used to build a physical layout of a complex IC. For example, additional MP_Cells may be built and pre-stored into the cell library 214 for filters, phase-locked loops, and others analog integrated circuits. While analog circuit design is described herein, embodiments of the disclosure may also be applicable to the analog elements of a mixed-signal design that combines both digital and analog elements.

While experienced analog designers are adept at studying the continuous interactions among the circuit elements in the signal path as the waveform evolves with time, the complex interaction resulting from nearby circuits, FILL and interconnect adds thousands of adjacent circuit elements including stray resistance, capacitance, and inductance into the integrated circuit. These extraneous circuit elements, however, are nearly impossible to determine, measure, or simulate during the conventional design process. Embodiments of the disclosure may reduce many of these variables by using the pre-defined circuit elements with FILL and interconnect already added and simulated for the analog circuit designer. The design tools may provide the analog circuit designer an instantaneous view of the schematic and the physical layout of the circuit. Once the analog circuit designer creates the schematic of his design, they may be able to immediately extract the electrical parameters, including the stray effect interaction between circuit elements, interconnects, signals, and the effects of FILL. From this extracted data, the designer can then run simulations of the circuit through such simulators as Cadence's SPECTRE, Mentor Graphics ELDO, or Simucad's SmartSpice.

Thus, embodiments of the disclosure may be built upon the physical structure of the integrated circuit and provide the analog circuit designer a simultaneous view of the physical design and the schematic. Because both the physical design and schematic information may be available, the analog circuit designer may have immediate access to circuit parameters for SPICE simulations. The analog circuit designer may then be able to view waveforms as the design progresses because both the physical and schematic structures are pre-defined. The structures developed by the analog circuit designer may not require changes to the physical design of the circuit after the design sent to the mask maker and circuit manufacturer. As a result, the fabricated circuits may not require changes to the design for Optical Proximity Correction (OPC) or further addition of circuit elements for planarization of the circuit layers as they are manufactured as they are already accounted for in the physical layout generated by the design tool. This is in contrast to conventional methods require that the mask maker change the physical design of the IC to include FILL that was not accounted for previously in the original design by the analog circuit designer.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A device for generating cells for an analog integrated circuit (IC) design tool for designing ICs, the device comprising:

a process-specific architectural cell (AP_Cell) for use with the analog IC design tool, the AP_Cell having a fixed number of circuit elements without internal wiring providing functionality, and configured according to a specific manufacturing process with manufacturing FILL, the AP_Cell comprising one or more electronic files;

a plurality of schematic cells (S_Cells) for use with the analog IC design tool, the plurality of schematic S_Cells having the fixed number of circuit elements, each schematic cell (S_Cell) having a different internal wiring for different functionalities, the plurality of schematic S_Cells comprising one or more electronic files; and a cell generator configured to receive the one or more electronic files of the plurality of S_Cells and the one or more electronic files of the AP_Cell and generate a set of process-specific cells having the different internal wiring of the S_Cells and configured to be design rule compliant according to the specific manufacturing process and manufacturing FILL of the AP_Cell, the process-specific cells comprising one or more electronic files.

2. The device of claim 1, wherein the set of process-specific cells includes a first set of process-specific schematic cells (SP_Cells), each SP_Cell of the first set having a different internal wiring and configured according to a first manufacturing process of a first AP_Cell.

3. The device of claim 2, wherein the set of process-specific cells includes a second set of process-specific schematic cells (SP_Cells), each SP_Cell of the second set having a different internal wiring and configured according to a second manufacturing process of a second AP_Cell.

4. The device of claim 1, wherein the circuit elements include one or more transistors, resistors, capacitors, inductors, diodes, other semiconductor devices, or combinations thereof.

5. The device of claim 1, wherein the set of process-specific cells is stored in a cell library accessible by a layout generator for creating a physical layout for an IC.

6. A method for generating a cell set for an analog design tool, the method comprising:

receiving, at a cell generator, one or more electronic files of a process-specific architectural cell (AP_Cell) having wiring for power and ground, FILL, the AP_Cell configured according to a first manufacturing process;

receiving, at the cell generator, one or more electronic files of a schematic cell (S_Cell) having internal wiring between circuit elements to provide a function for the S_Cell; and merging data from the one or more electronic files of the AP_Cell and the one or more electronic files of the S_Cell to generate a process-specific schematic cell (SP_Cell) used as a building block for a physical layout of an analog IC, the process-specific schematic cell comprising one or more electronic files.

7. The method of claim 6, further comprising:

connecting multiple S_Cells together to form a multiple schematic cell (M_Cell) having a greater functionality; and merging data from the AP_Cell and the M_Cell to generate a process-specific multiple schematic cell (MP_Cell) used as a building block for a physical layout of an analog IC.

8. The method of claim 6, further comprising connecting multiple SP_Cells together to form a process-specific multiple schematic cell (MP_Cell) having a greater functionality used as a building block for a physical layout of an analog IC.

* * * * *

UNITED STATES PATENT AND TRADEMARK OFFICE
CERTIFICATE OF CORRECTION

PATENT NO. : 11,042,682 B2
APPLICATION NO. : 16/946272
DATED : June 22, 2021
INVENTOR(S) : Kent F. Smith et al.

It is certified that error appears in the above-identified patent and that said Letters Patent is hereby corrected as shown below:

In the Drawings

Please replace FIGS. 5B, 5C, 5D, 5E, 8, and 10 with the attached replacement drawings In the Specification

| | | |
|---|---|---|
| Column 2, | Line 62, | Insert before paragraph beginning --FIG. 1 is a-- the following omitted paragraph:<br>--The patent or application file contain at least one drawing executed in color. Copies of this patent or patent application publication with color drawings will be provided by the Office upon request and payment of the necessary fee.-- |
| Column 4, | Line 59, | change "Fill" to --FILL-- |
| Column 4, | Line 63, | change "(e.g," to --(e.g.,-- |

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*